United States Patent
Kakinuma et al.

(10) Patent No.: US 9,252,435 B2
(45) Date of Patent: Feb. 2, 2016

(54) SOLID OXIDE FUEL CELL DEVICE

(71) Applicant: TOTO LTD., Fukuoka (JP)

(72) Inventors: Yasuo Kakinuma, Kitakyushu (JP); Akira Kawakami, Kitakyushu (JP); Shuichiro Saigan, Kitakyushu (JP); Shigeru Ando, Kitakyushu (JP); Chihiro Kobayashi, Kitakyushu (JP); Masato Ota, Kitakyushu (JP); Naoki Watanabe, Kitakyushu (JP); Nobuo Isaka, Kitakyushu (JP); Yuya Takahashi, Kitakyushu (JP); Megumi Shimazu, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 18 days.

(21) Appl. No.: 14/348,563

(22) PCT Filed: Sep. 27, 2012

(86) PCT No.: PCT/JP2012/074912
§ 371 (c)(1),
(2) Date: Mar. 28, 2014

(87) PCT Pub. No.: WO2013/047667
PCT Pub. Date: Apr. 4, 2013

(65) Prior Publication Data
US 2014/0227623 A1    Aug. 14, 2014

(30) Foreign Application Priority Data

Sep. 30, 2011  (JP) ................. 2011-217867
Mar. 23, 2012  (JP) ................. 2012-066987

(51) Int. Cl.
*H01M 8/02*    (2006.01)
*H01M 8/12*    (2006.01)
(Continued)

(52) U.S. Cl.
CPC ............ *H01M 8/0282* (2013.01); *H01M 8/004* (2013.01); *H01M 8/0252* (2013.01); *H01M 8/1213* (2013.01); *H01M 8/243* (2013.01); *Y02E 60/521* (2013.01); *Y02E 60/525* (2013.01)

(58) Field of Classification Search
CPC ... H01M 8/1213; H01M 8/243; H01M 8/004; H01M 8/0252; H01M 8/0282
See application file for complete search history.

(56) References Cited

U.S. PATENT DOCUMENTS

2003/0215689 A1* 11/2003 Keegan ................... 429/35
2009/0081516 A1*  3/2009 Watanabe et al. ........ 429/31
(Continued)

FOREIGN PATENT DOCUMENTS

CN        102130354 A     7/2011
DE    102005011555 A1    9/2006
(Continued)

OTHER PUBLICATIONS

International Search Report; PCT/JP2012/074912; Oct. 30, 2012.

*Primary Examiner* — Muhammad Siddiquee
(74) *Attorney, Agent, or Firm* — Studebaker & Brackett PC

(57) ABSTRACT

In a fuel cell unit 16 that constitutes a fuel cell module 2 of an SOFC device 1, a collector cap 86a is connected to an inner electrode layer 90 via a seal material 96 as an Ag seal portion. A glass coating 30 (dense body) is filled up between the inner electrode layer 90 and an electrolyte layer 94 and the collector cap 86a to cover an upper end surface 96a of the seal material 96. As such, the fuel cell unit 16 includes the seal material 96 constituting as an Ag seal portion that separates a fuel gas from an oxidant gas, and a glass coating 30 at least partially formed to over at least either the fuel gas side surface of the seal material 96 or the oxidant gas side surface of the seal material 96.

5 Claims, 20 Drawing Sheets

(51) Int. Cl.
*H01M 8/24* (2006.01)
*H01M 8/00* (2006.01)

(56) References Cited

U.S. PATENT DOCUMENTS

2010/0143760 A1* 6/2010 DeRose et al. ............... 429/30
2010/0159344 A1 6/2010 Gottmann et al.
2011/0165494 A1 7/2011 Yamanis
2012/0107716 A1* 5/2012 Yoshida et al. ............... 429/468

FOREIGN PATENT DOCUMENTS

| JP | 04-075262 A | 3/1992 |
| JP | 2009-129718 A | 6/2009 |
| JP | 2009-129852 A | 6/2009 |

* cited by examiner

← FLOW OF POWER GENERATION AIR
←---- FLOW OF COMBUSTION GAS

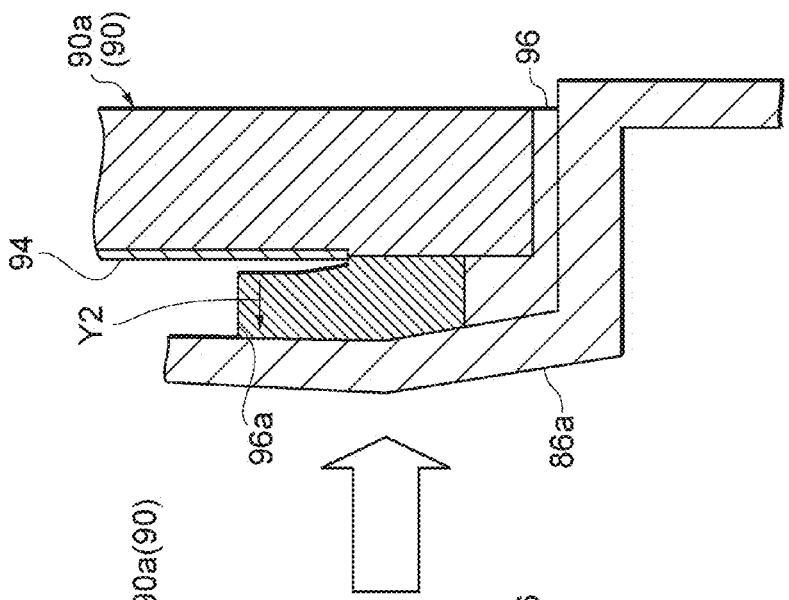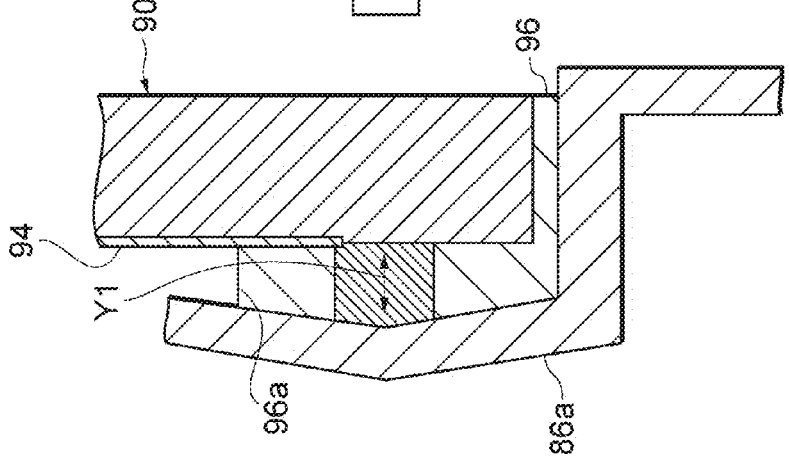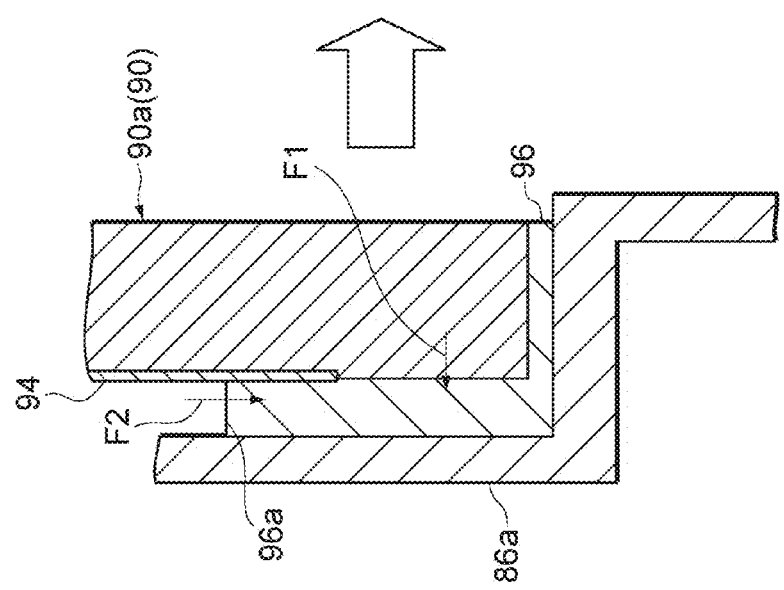

SOLID OXIDE FUEL CELL DEVICE

TECHNICAL FIELD

The present invention relates to a solid oxide fuel cell device that generates power by using fuel gas and oxidant gas.

BACKGROUND ART

A solid oxide fuel cell (hereinafter also referred to as "SOFC") is a fuel cell device including an oxygen ion conductive solid electrolyte as an electrolyte, and two electrodes that are mounted to opposite sides of the electrolyte. Fuel gas is supplied to one electrode, and oxidant gas (air, oxygen, or the like) is supplied to the other electrode, and a power generation reaction is caused at a relatively high temperature to thereby generate power.

Specifically, the SOFC generally includes a fuel cell assembly (fuel cell stack) having a plurality of tubular fuel cells each including a fuel electrode (anode) layer, an air electrode (cathode) layer, and a solid electrolyte layer held therebetween. The SOFC is actuated by fuel gas and oxidant gas (air, oxygen, or the like) flowing from one side to the other side of the fuel cells. Unreformed gas (city gas or the like) as source gas is supplied from outside the SOFC. The unreformed gas is introduced into a reformer containing a reforming catalyst and reformed into fuel gas rich with hydrogen. The fuel gas is supplied to the fuel cell assembly.

The SOFC is configured to perform, as a starting step for reforming the unreformed gas with the reformer, a plurality of steps that includes a partial oxidation reforming (PDX) reaction step, an auto thermal reforming (ATR) reaction step, and a steam reforming (SR) reaction step, and then move to a power generation step. The SOFC can sequentially perform these steps to heat the reformer, the fuel cell stack, or the like to an operation temperature.

In such an SOFC, a gas seal structure that isolates a fuel gas channel from an oxidant gas channel is generally provided in order to separate a fuel gas and an oxidant gas. Various types of these gas seal structures have been studied. For example, a seal material made of silver (Ag) or mainly composed of Ag is desirably used for a gas seal structure because of high compactness (gas impermeability). Ag is also desirably used because Ag degradation due to oxidation or the like practically does not occur at a normal operation temperature (about 500° C. to 700° C.) of the fuel cells in the SOFC. Such an Ag seal material can be formed by sintering a brazed material on an area on which the Ag seal material is to be placed, and Ag is not oxidized even at a sintering temperature (about 1000° C.) at the time.

However, for example, as shown in Non Patent Literature 1, pores will be generated wholly inside the Ag due to water (water vapor) which is generated by the reaction of hydrogen and oxygen that are diffused in the Ag, when the Ag, which is contacted by both reducing atmosphere and oxidizing atmosphere, is heated to about 500° C. The pores, which are mainly formed along a grain boundary, will cause cracks to occur and develop in the Ag due to contact between the pores and portions where water (water vapor) occurs. Thus, the Ag degrades over time while the Ag expands (in other words "the porosity with Ag expansion"), leading to leaks of fuel gas and oxidant gas. The two gases, which are mixed and reacted to produce water, are consumed ineffectually, resulting in remarkable deterioration of power generation efficiency.

CITATION LIST

Non Patent Literature

Non Patent Literature 1: P. Singh et al., JMEPEG, 2004, 13. pp. 287-294

SUMMARY OF INVENTION

Technical Problem

As such, use of the Ag seal material constituting a gas seal structure for separating the fuel gas and the oxidant gas in the SOFC may have disincentive. However, if such incentive is overcome, the use of the Ag seal material is desired considering an excellent property inherent in Ag as described above.

Thus, the present invention is achieved in view of such circumstances, and has an object to provide a solid oxide fuel cell device that suppresses degradation of an Ag material that constitutes a gas seal structure for separating a side with oxidizing reaction from a side with reducing reaction, thereby prevents fuel gas and oxidant gas from leaking and contacting each other, and thus allows output the solid oxide fuel cell device with high power generation efficiency to be maintained.

Solution to Problem

In order to achieve the object, the present invention provides a solid oxide fuel cell (SOFC) device that generates power by using fuel gas and oxidant gas, including a fuel cell assembly having a plurality of fuel cells each including a fuel electrode layer to which the fuel gas is supplied, an air electrode layer to which the oxidant gas is supplied, and a solid electrolyte layer provided between the fuel electrode layer and the air electrode layer, wherein the fuel cell includes an Ag seal portion that separates the fuel gas and the oxidant gas, and a dense body at least partially is formed over at least either a fuel gas side surface of the Ag seal portion or a oxidant gas side surface of the Ag seal portion.

In the SOFC device, the fuel cell has the Ag seal portion for separating the fuel gas and the oxidant gas and has high compactness (gas impermeability) of the Ag seal portion to suppress degradation due to oxidation or the like even during operation of the fuel cell, and during the formation of the Ag seal portion by sintering.

The dense body on the Ag seal portion is at least partially formed (coats) over at least either the fuel gas side surface of the Ag seal portion or a oxidant gas side surface of the Ag seal portion, thereby preventing at least any of hydrogen atoms (H), oxygen atoms (O), and water vapor ($H_2O$) from entering the Ag seal portion. This can prevent degradation of Ag that leads to pores or cracks in the Ag seal portion due to water vapor. This can also prevent contact between the fuel gas and the oxidant gas, which causes a reaction between the two gases to produce water and thereby avoid wasting consumption of the gases, which consumption causes deterioration of power generation efficiency leading to reduced output (in short, the porosity with expansion of the Ag seal portion leading to deterioration of output). Alternatively, even if some pores are generated in the Ag seal portion, the dense body functions as a barrier material that prevents contact between the fuel gas and the oxidant gas, and prevents consumption of the gases, which consumption causes deterioration of power generation efficiency leading to reduced output (the porosity with expansion of the Ag seal portion leading to deterioration of output).

The Ag seal portion may be made of Ag, an alloy mainly composed of Ag, a material containing Ag with a small amount (small percent by mass) of metal oxide being added or an alloy mainly composed of Ag with a small amount (small percent by mass) of metal oxide being added.

The dense body may be made of an inorganic material such as glass or ceramic. The dense body is more preferably made of glass. The "glass" includes amorphous glass, crystallized glass and a mixture of amorphous and crystallized glass. The "amorphous glass" includes amorphous glass (narrowly-defined glass) with glass transition (having glass transition point Tg), and also includes amorphous glass without glass transition.

Glass can be generally softened or melted at a temperature below the melting point of the Ag that is a constituent material for the Ag seal portion. Thus, using glass as a dense body can more reliably cover the Ag seal portion than using a material other than glass, thereby increasing sealing performance of the Ag seal portion and sealing performance by the Ag seal portion. The glass generally has high morphological stability at an operation temperature of a fuel cell. This further increases the sealing performance of the Ag seal portion and the sealing performance by the Ag seal portion. As a result, contact between the fuel gas and the oxidant gas via the Ag seal can be more reliably prevented, thereby further effectively preventing the porosity with expansion of the Ag seal portion leading to deterioration of output.

It is also preferable that the SOFC device further includes a partition provided between the plurality of fuel cells, the Ag seal portion is filled between the fuel cell and the partition, and the dense body is formed over the fuel cell, the Ag seal portion, and the partition.

With such a configuration, the dense body covers a wide region around the Ag seal portion including a boundary between the fuel cell and the Ag seal portion, and a boundary between the Ag seal portion and the partition, thereby further increasing sealing performance. This further increases sealing performance by the Ag seal portion. Thus, contact between the fuel gas and the oxidant gas via the Ag seal portion can be further prevented, thereby further preventing the porosity with expansion of the Ag seal portion leading to deterioration of output.

It is preferable that the SOFC device further includes a concave portion surrounded and defined by the fuel cell, the Ag seal portion and the partition, and the dense body is formed over an inner wall of the concave portion.

With such a configuration, the concave portion can be a retention portion that retains the dense body, and when the dense body is filled in the concave portion, the concave portion easily holds the dense body therein. Thus, the dense body can be more reliably formed over the fuel cell, the Ag seal portion, and the partition, thereby further preventing the porosity with expansion of the Ag seal portion leading to deterioration of output.

As more specific configuration, there is an aspect in which the partition includes a conductive cap partially covers the fuel cell. In this case, the concave portion is surrounded and defined by the fuel cell, the Ag seal portion, and the conductive cap.

It is more preferable that the thickness of the dense body on the Ag seal portion in the concave portion is larger than the thickness of the dense body on the fuel cell in the concave portion and the thickness of the dense body on the partition in the concave portion. In other words, it is useful that the dense body is formed so that an area on the Ag seal portion side has a relatively larger thickness, and an area on the fuel cell side and an area on the partition (conductive cap) side have relatively smaller thicknesses.

As described above, in the fuel cell where the dense body is made of, for example, glass, and the Ag seal portion is provided in contact with a conductor portion in the fuel cell (for example, the fuel electrode layer or the air electrode layer), and another conductor portion such as the conductive cap as the partition, the dense body and the conductor portions generally tend to be significantly different in thermal expansion coefficient. The dense body is formed such that the thicknesses of the dense body that is disposed on conductor portions having different thermal expansion coefficient is small, thereby preventing cracks in the dense body from occurring, which cracks may be caused by recycling of expansion/contraction of the fuel cell during its operation/stop. Thus, the sealing performance of the Ag seal portion and the sealing performance by the Ag seal portion can be favorably maintained. As a result, contact between the fuel gas and the oxidant gas via the Ag seal can be further prevented, thereby particularly effectively preventing deterioration of output due to the porosity with expansion of the Ag seal portion.

It is also preferable that an oxide containing lanthanum and chrome such as, for example, lanthanum chromite ($LaCrO_3$) that is a perovskite-type complex oxide may be used as the dense body. Among them, a lanthanum-chromite-based sintered body doped with an addition component such as Ca or Sr is particularly preferable. This is because the lanthanum-chromite-based sintered body doped with an addition component such as Ca or Sr has electrical conductivity, is stable under oxidizing atmosphere and reducing atmosphere even at a high temperature, and hardly reacts with hydrogen and oxygen.

Advantageous Effect of Invention

According to the present invention, the dense body is at least partially formed over at least either the fuel gas side of the Ag seal portion or the oxidant gas side of the Ag seal portion for separating the fuel gas and the oxidant gas. This can effectively prevent degradation of Ag such pores or cracks in the Ag seal portion, and resulting contact between the fuel gas and the oxidant gas leading to production of water. Thus, even when the Ag material is used as a gas seal structure for separating the fuel gas and the oxidant gas, the degradation can be prevented. As a result, leaks and contact of the fuel gas and the oxidant gas as well as the porosity with expansion of the Ag seal portion can be prevented to maintain high power generation efficiency and output of the SOFC.

BRIEF DESCRIPTION OF DRAWINGS

FIGS. 12(A) to 12(C) are partial sectional views schematically showing states of occurrence of the porosity with Ag expansion in a conventional configuration without a glass coating on a seal material.

DESCRIPTION OF EMBODIMENTS

Figure 1:
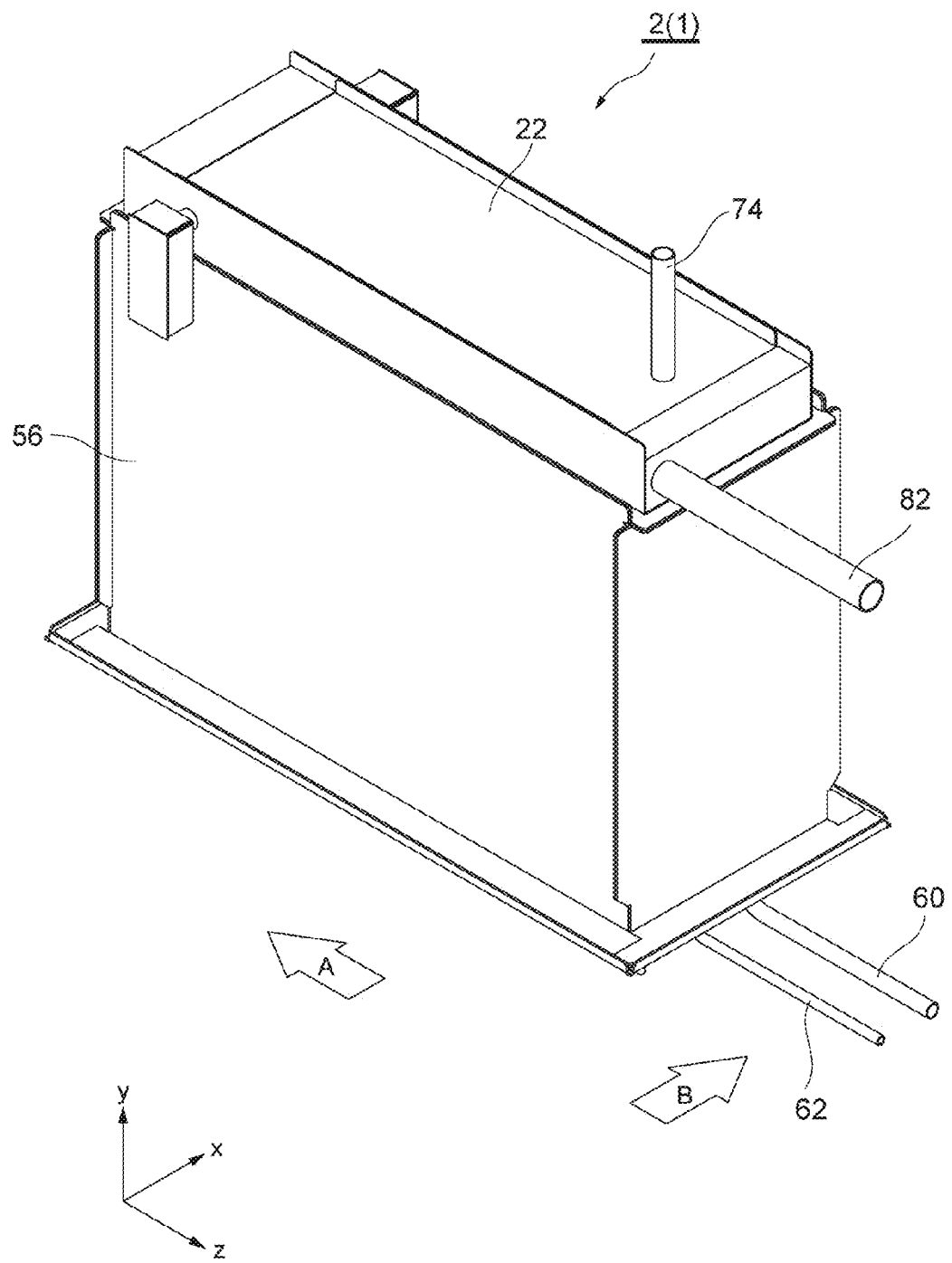
FIG. 1 is a perspective view showing an appearance of a fuel cell module according to a preferable embodiment of the present invention.

Now, embodiments of the present invention will be described with reference to the drawings. For easy understanding of the description, the same components are denoted by the same reference numerals as much as possible in the drawings, and overlapping descriptions will be omitted. Proportions are not limited to those in the drawings. Further, the embodiments described below are exemplary for describing the present invention, and are not intended to limit the present invention to the embodiments only. Further, many variations may be made to the present invention without departing from the gist of the present invention.

FIG. 1 is a perspective view schematically showing an appearance of an SOFC device according to a preferable embodiment of the present invention. A fuel cell module 2 constitutes a part of the SOFC device 1 according to the present invention. The SOFC device 1 includes the fuel cell module 2, and an accessory unit (not shown).

In FIG. 1, an x-axis, a y-axis, and a z-axis are defined as a three-dimensional axis coordinate. Specifically, a height direction of the fuel cell module 2 is defined as a y-axis direction, the x-axis and the z-axis are provided along a plane perpendicular to the y-axis, a short direction of the fuel cell module 2 is defined as an x-axis direction, and a longitudinal direction of the fuel cell module 2 is defined as a z-axis direction. The x-axis, the y-axis, and the z-axis in FIG. 2 and thereafter are based on the x-axis, the y-axis, and the z-axis in FIG. 1. Further, a direction extending to a negative side from an origin of the z-axis is defined as an A direction, and a direction extending to a positive side from an origin of the x-axis is defined as a B direction.

The fuel cell module 2 includes a casing 56 that houses fuel cells (described later in detail) and a heat exchanger 22 provided on the casing 56. An unreformed gas supply pipe 60 and a water supply pipe 62 are connected to the casing 56. A power generation air inlet pipe 74 and a combustion gas exhaust pipe 82 are connected to the heat exchanger 22.

The unreformed gas supply pipe 60 is a pipe for supplying unreformed gas for reforming such as city gas into the casing 56. The water supply pipe 62 is a pipe for supplying water to be used for reforming the unreformed gas with water vapor. Further, the power generation air inlet pipe 74 is a pipe for supplying air to cause power generation reaction with fuel gas. The combustion gas exhaust pipe 82 is a pipe for exhausting combustion gas generated by combustion of the fuel gas after the power generation reaction.

Figure 2:
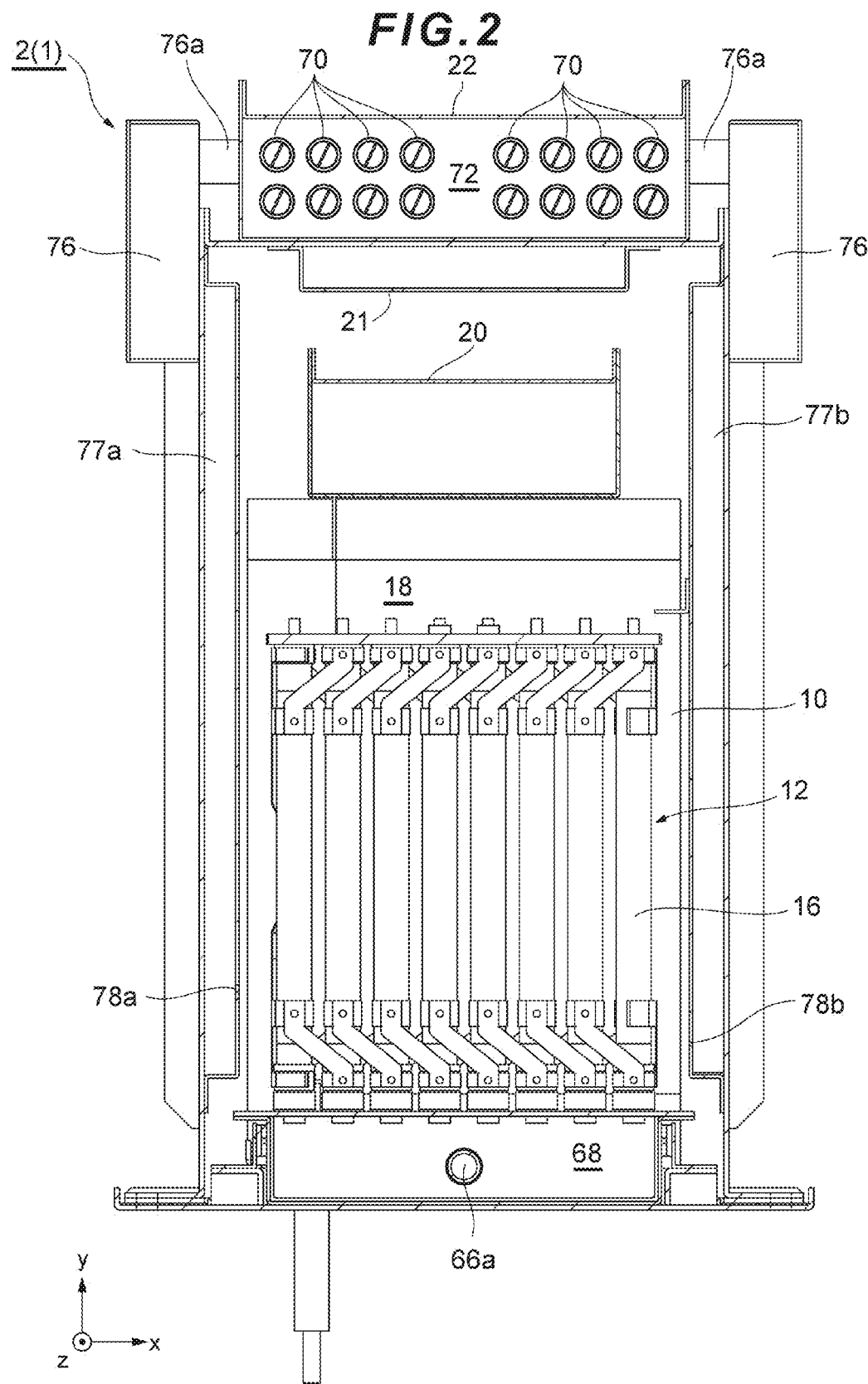
FIG. 2 is a sectional view of the fuel cell module in FIG. 1 taken at around the center thereof in the direction A in FIG. 1.
Figure 3:
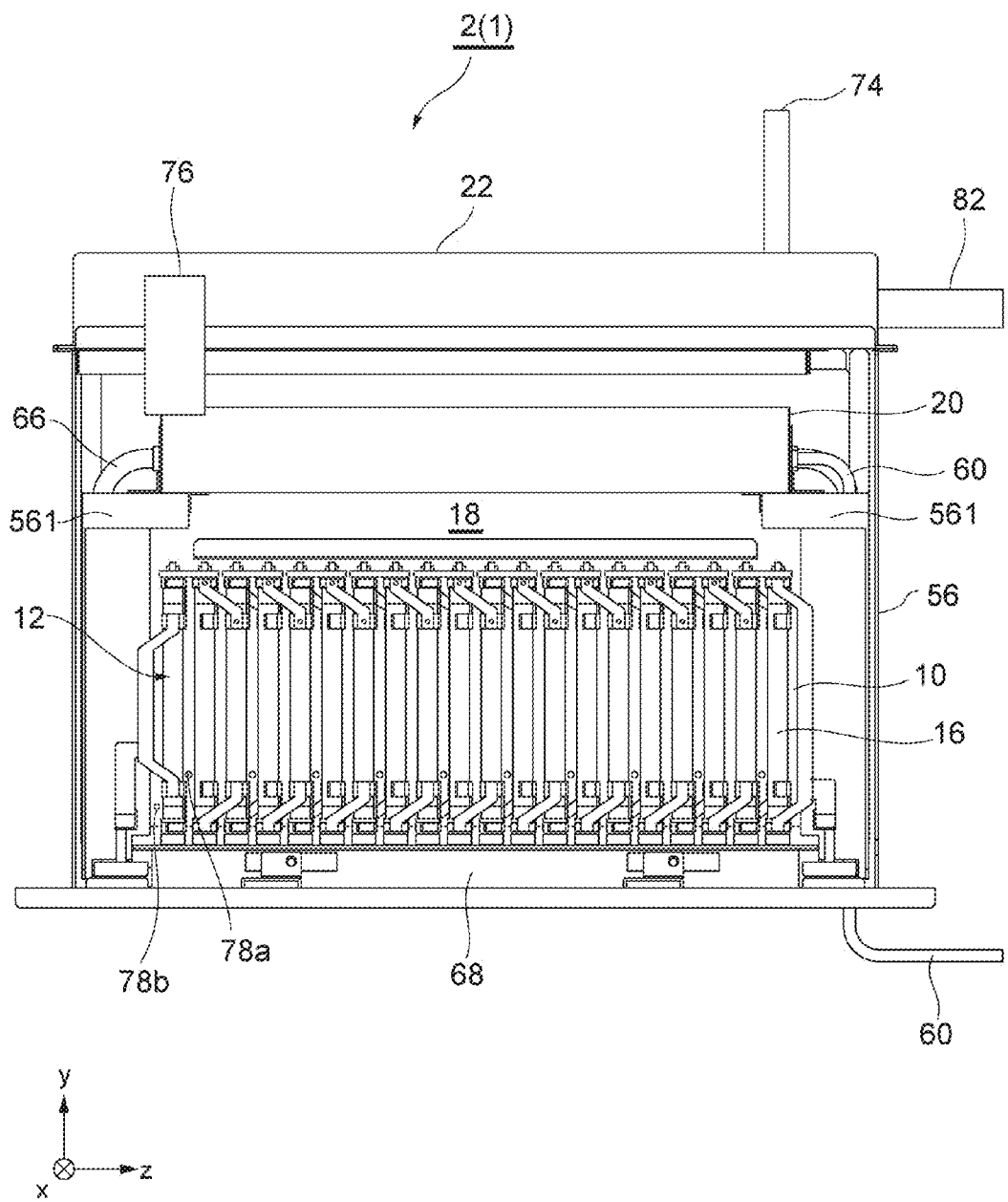
FIG. 3 is a sectional view of the fuel cell module in FIG. 1 taken at around the center thereof in the direction B in FIG. 1.
Figure 4:
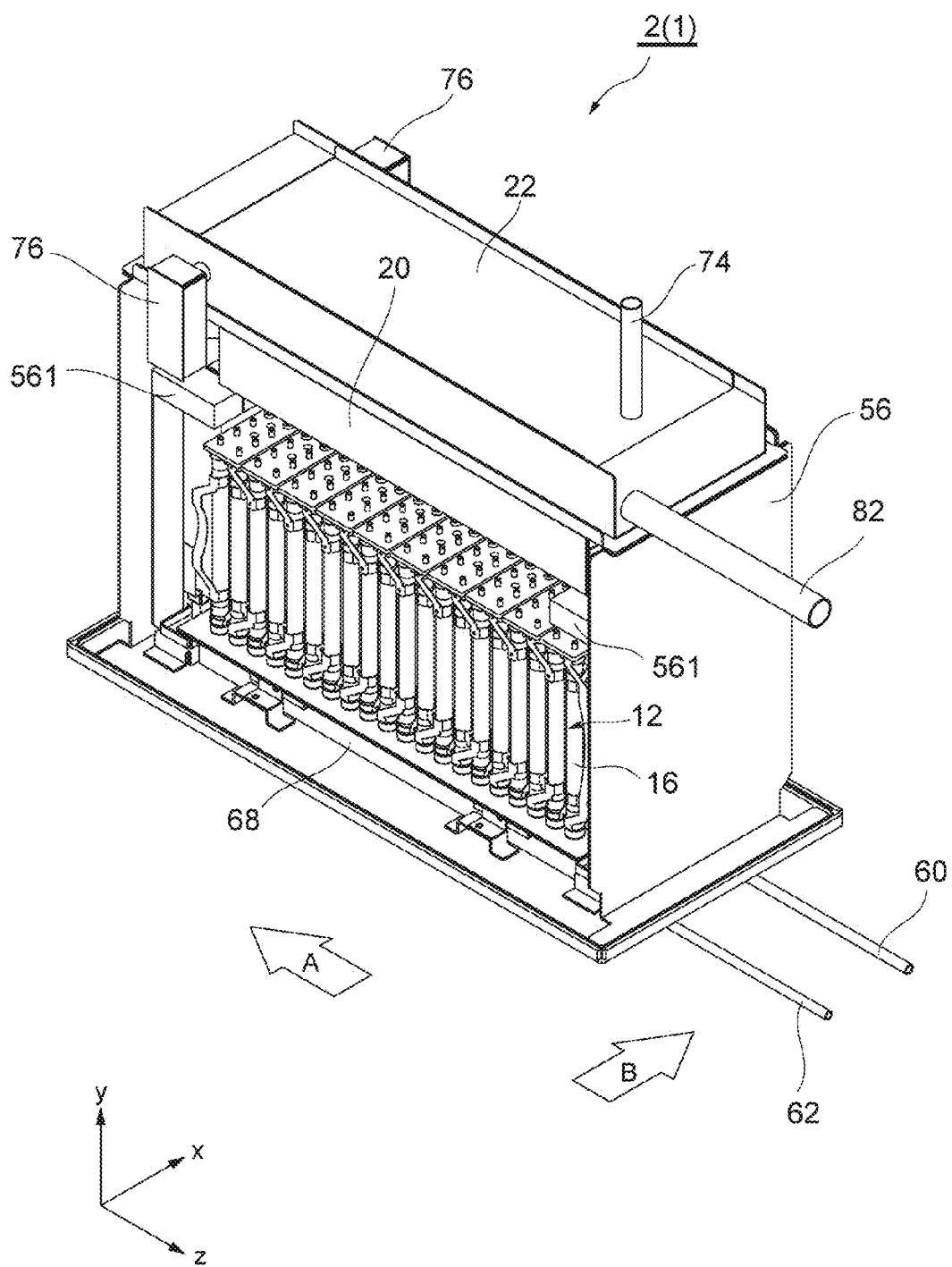
FIG. 4 is a perspective view showing a part (outer plate) of a casing being removed from the fuel cell module in FIG. 1.
Figure 5:
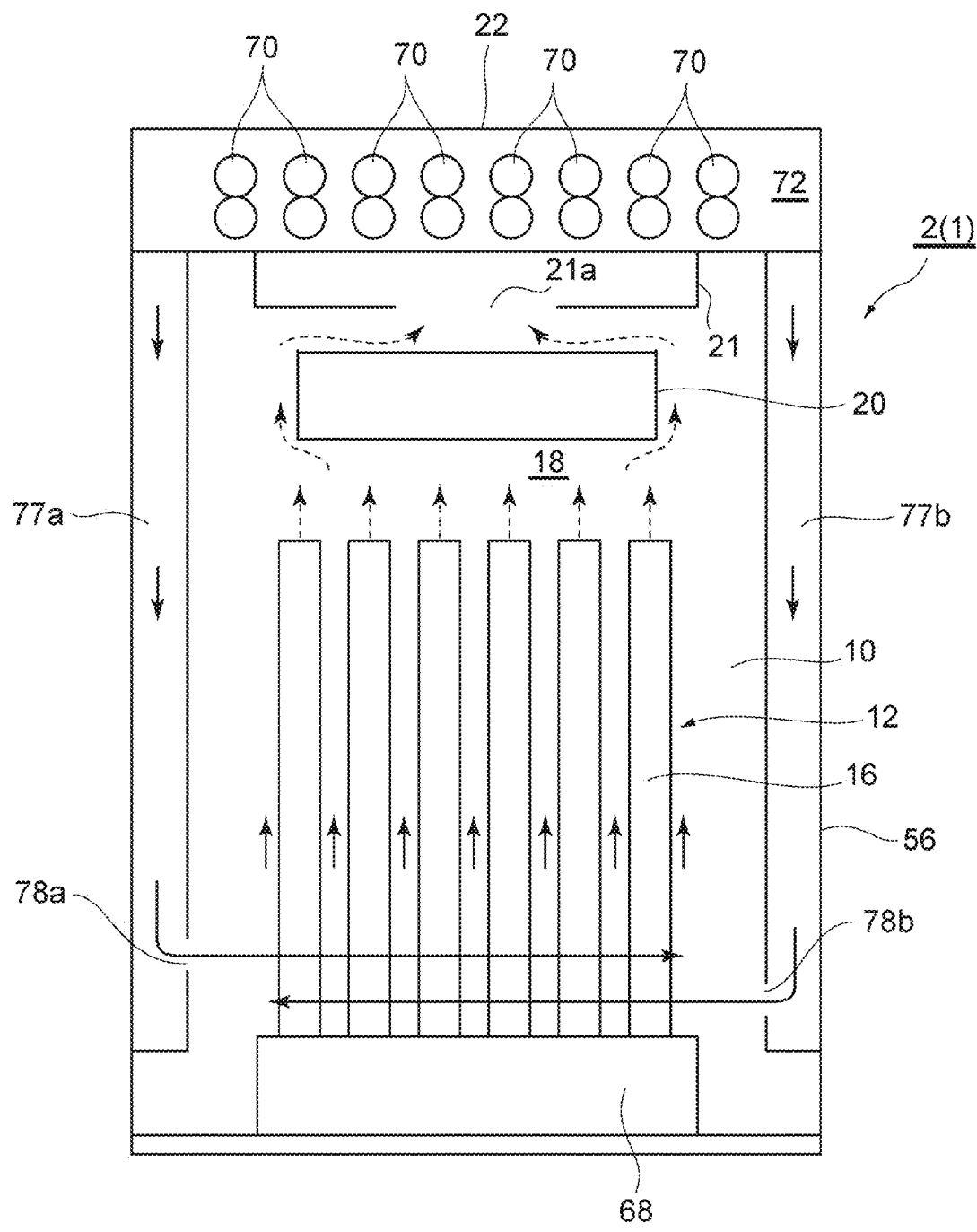
FIG. 5 is a schematic view corresponding to FIG. 2 showing flows of power generation air and combustion gas.
Figure 6:
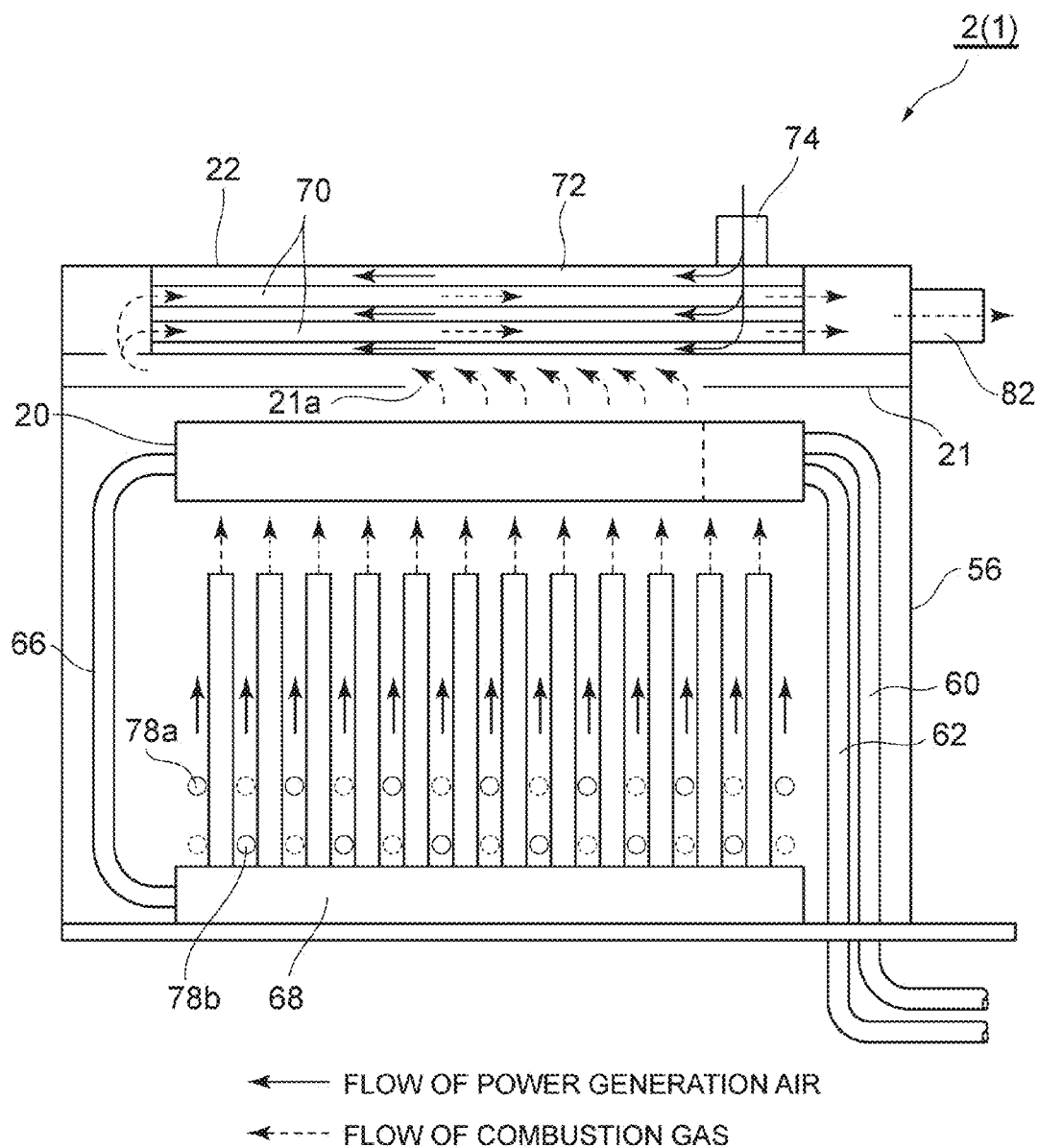
FIG. 6 is a schematic view corresponding to FIG. 3 showing flows of power generation air and combustion gas.

With reference to FIGS. 2 to 6, an internal configuration of the fuel cell module 2 will be described. FIG. 2 is a sectional view of the fuel cell module 2 taken at around the center thereof in the direction A in FIG. 1. FIG. 3 is a sectional view of the fuel cell module 2 taken at around the center thereof in the direction B in FIG. 1. FIG. 4 is a perspective view showing a part (outer plate) of the casing 56 covering a fuel cell assembly being removed from the fuel cell module 2 in FIG. 1. Further, FIG. 5 is a schematic view corresponding to FIG. 2 showing flows of power generation air and combustion gas. FIG. 6 is a schematic view corresponding to FIG. 3, also showing flows of power generation air and combustion gas.

As shown in FIGS. 2 to 4, a fuel cell assembly 12 in the fuel cell module 2 is housed in the casing 56 so as to be entirely covered with the casing 56. As shown in FIG. 5, the fuel cell assembly 12 generally has a substantially rectangular parallelepiped shape longer in the A direction than in the B direction, and defines an upper surface on the side of a reformer 20, a lower surface on the side of a fuel gas tank 68, long side surfaces extending in the A direction in FIG. 2, and short side surfaces extending in the B direction in FIG. 2.

In this embodiment, an evaporation mixer (not specifically shown) for evaporating water supplied from the water supply pipe 62 is provided in the reformer 20. The evaporation mixer is heated by combustion gas to evaporate water, and also mixes the water vapor, fuel gas (city gas) that is unreformed gas and air.

The unreformed gas supply pipe 60 and the water supply pipe 62 are introduced into the casing 56 and then connected to the reformer 20. More specifically, as shown in FIG. 3, the unreformed gas supply pipe 60 and the water supply pipe 62 are connected to an upstream end of the reformer 20, which is described a right end in the drawing. The reformer 20 is placed above a combustion chamber 18 that is defined above the fuel cell assembly 12. Thus, the reformer 20 is heated by combustion heat from remaining fuel gas and air after the power generation reaction, and functions as an evaporation mixer and a reformer for causing reforming reaction. Further, an upper end of a fuel supply pipe 66 is connected to a flow end (a left end in FIG. 3) of the reformer 20, and a lower end side 66a of the fuel supply pipe 66 is placed to enter the fuel gas tank 68 (see FIG. 2).

As shown in FIGS. 3 and 4, the fuel gas tank 68 is provided substantially beneath the fuel cell assembly 12, and configured to support a lower end of each fuel cell unit 16 and distribute the fuel gas to each fuel cell unit 16. A plurality of small holes (not shown) are formed in the longitudinal direction (A direction) in an outer periphery of the lower end side 66a of the fuel supply pipe 66 inserted into the fuel gas tank 68. The plurality of small holes (not shown) enable the fuel gas reformed by the reformer 20 to uniformly flow into the fuel gas tank 68 in the longitudinal direction. The fuel gas supplied to the fuel gas tank 68 is supplied into a fuel gas channel (described later in detail) in each fuel cell unit 16 that constitutes the fuel cell assembly 12, and rises in the fuel cell unit 16 to the combustion chamber 18.

With reference to FIGS. 2 to 6, a mechanism for supplying power generation air into the fuel cell module 2 will be described. As shown in FIGS. 5 and 6, a heat exchanger 22 is provided above the reformer 20. A plurality of combustion gas pipes 70 are provided in the heat exchanger 22, and a power generation air channel 72 is provided around the combustion gas pipe 70.

The power generation air inlet pipe 74 is mounted to one end side (right end side in FIG. 3) on an upper surface of the heat exchanger 22. The power generation air inlet pipe 74 introduces power generation air into the heat exchanger 22 from a power generation air flow amount adjustment unit (not shown). A pair of outlet ports 76a in the power generation air channel 72 are formed on the other end side (left end side in FIG. 3) on the upper surface of the heat exchanger 22. The outlet port 76a communicates with a pair of communication channels 76. Further, as shown in FIG. 2, on opposite outer sides of the casing 56 of the fuel cell module 2 in a width direction (the B direction: short side direction), power generation air supply passages 77a, 77b are provided in the longitudinal direction of the fuel cell assembly 12.

With such a configuration, power generation air is supplied from the outlet port 76a and the communication channel 76 in the power generation air channel 72 to the power generation air supply passages 77a, 77b. Also, a plurality of blow-out ports 78a (first blow-out ports) and blow-out ports 78b (second blow-out ports) for delivering power generation air toward each fuel cell unit 16 of the fuel cell assembly 12 in the power generation chamber 10 are formed in positions corresponding to lower sides of the power generation air supply passages 77a, 77b and the fuel cell assembly 12 (lower end side of the fuel cell unit 16). The power generation air delivered from the blow-out ports 78a, 78b into clearances between the plurality of fuel cell units 16 flows upward along the outside of each fuel cell unit 16 (flows from downward to upward).

A mechanism for exhausting combustion gas generated by combustion of fuel gas and power generation air (oxidant gas) in the combustion chamber 18 will be described. The combustion gas generated in an upper side of the fuel cell unit 16 rises in the combustion chamber 18 to a rectifier 21 having an opening 21a. The combustion gas is introduced from the opening 21a to one end of the heat exchanger 22, and the combustion gas having passed through the opening 21a reaches the other end of the heat exchanger 22. As described above, the plurality of combustion gas pipes 70 for exhausting the combustion gas are provided in the heat exchanger 22, a combustion gas exhaust pipe 82 is connected to a flow end of the combustion gas pipes 70, and thus the combustion gas is exhausted outside.

Figure 7:
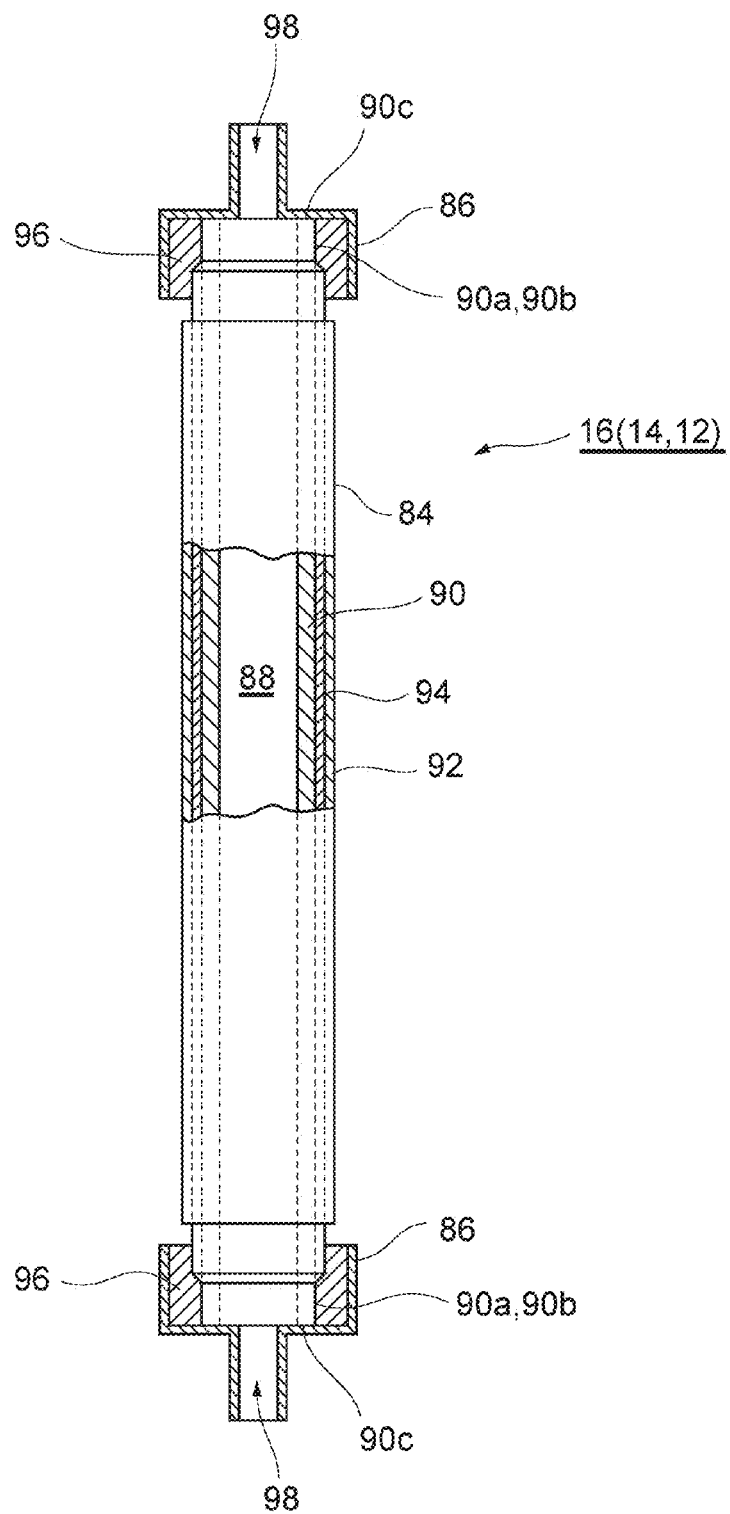
FIG. 7 is a partial sectional view showing a fuel cell unit in the fuel cell module in FIG. 1.

With reference to FIG. 7, the fuel cell unit 16 will be described. FIG. 7 is a partial sectional view showing the fuel cell unit 16 in this embodiment. As shown, the fuel cell unit 16 includes a fuel cell 84, and inner electrode terminals 86 each connected to shown upper and lower ends of the fuel cell 84.

The fuel cell 84 is a vertically extending tubular structure, and includes a cylindrical inner electrode layer 90 (fuel electrode layer) that defines a fuel gas channel 88 therein, a cylindrical outer electrode layer 92 (air electrode layer), and an electrolyte layer 94 placed between the inner electrode layer 90 and the outer electrode layer 92. The inner electrode layer 90 is a fuel electrode through which fuel gas flows and functions as a negative electrode, while the outer electrode layer 92 is an air electrode in contact with air and functions as a positive electrode.

The inner electrode terminals 86, 86 mounted to the upper and lower end sides of the fuel cell unit 16 have the same structure, and thus the inner electrode terminal 86 mounted to the upper end side is taken as an example and described in detail. An exposed portion 90a of the inner electrode layer 90 includes an outer peripheral surface 90b and an upper end surface 90c exposed to the electrolyte layer 94 and the outer electrode layer 92. The inner electrode terminal 86 is electrically connected to the inner electrode layer 90 such that the inner electrode terminal 86 is directly connected to the upper end surface 90c of the inner electrode layer 90, or connected via a conductive seal material 96 (Ag seal portion) mainly composed of silver (Ag) to the outer peripheral surface 90b of the inner electrode layer 90 and the upper end surface 90c of the inner electrode layer 90. In FIG. 7, the inner electrode terminal 86 is shown in direct contact with the upper end surface 90c of the inner electrode layer 90, and in FIGS. 9 and 10 mentioned later, a configuration is particularly shown in which both the upper end surface and the outer peripheral surface of the inner electrode layer 90 are connected to the inner electrode terminal 86 via the conductive seal material 96. A fuel gas channel 98 that communicates with the fuel gas channel 88 of the inner electrode layer 90 is provided in the center of the inner electrode terminal 86.

The inner electrode layer 90 is made of, for example, at least one of a mixture of Ni and zirconia doped with at least one of rare earth elements such as Ca, Y, and Sc, a mixture of Ni and ceria doped with at least one of rare earth elements and a mixture of Ni and lanthanum gallate doped with at least one of Sr, Mg, Co, Fe, and Cu.

The electrolyte layer 94 is made of, for example, at least one of zirconia doped with at least one of rare earth elements such as Y and Sc, ceria doped with at least one of rare earth elements and lanthanum gallate doped with at least one of Sr and Mg.

Further, the outer electrode layer 92 is made of, for example, at least one of lanthanum manganite doped with at least one of Sr and Ca, lanthanum ferrite doped with at least one of Sr, Co, Ni and Cu, lanthanum cobaltite doped with at least one of Sr, Fe, Ni and Cu, Ag, or the like.

Figure 8:
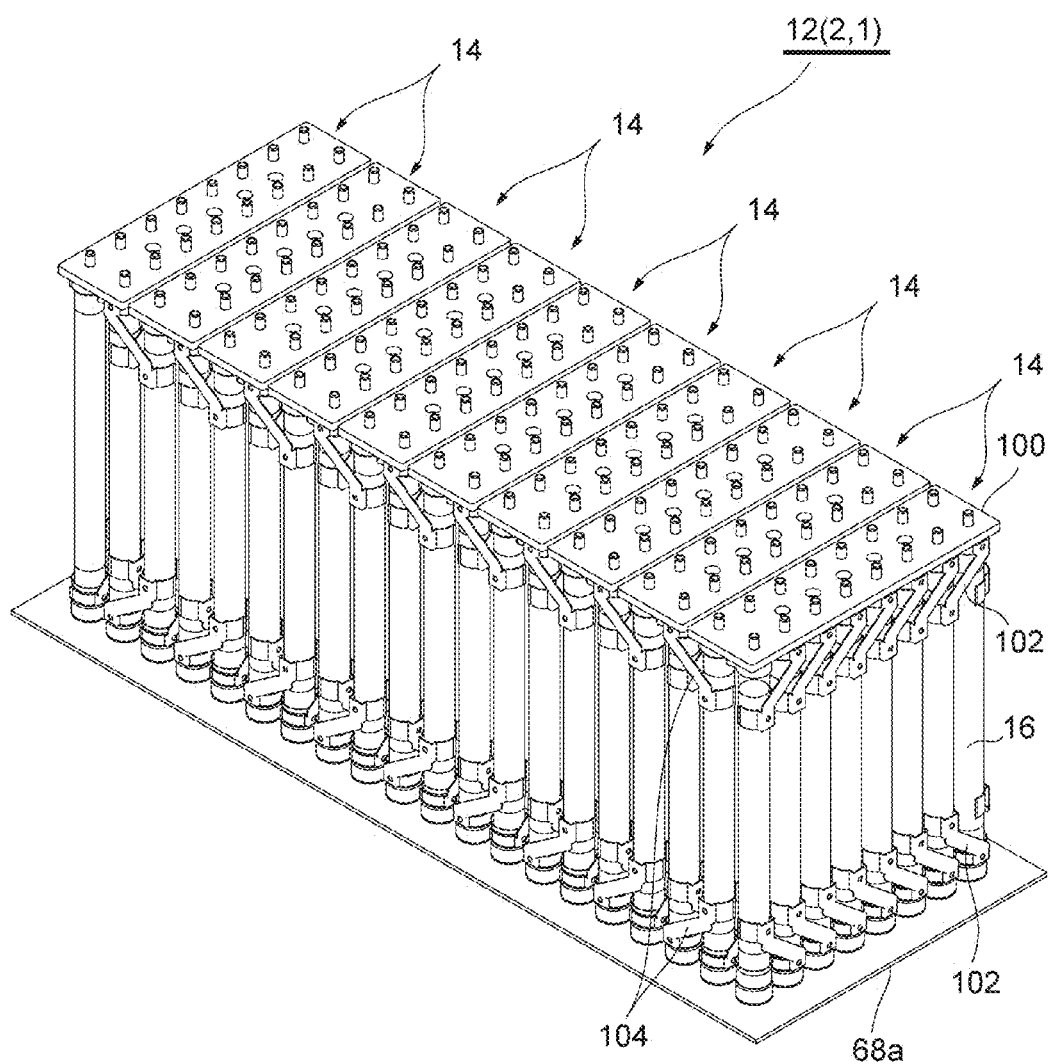
FIG. 8 is a perspective view showing a configuration of a fuel cell stack in the fuel cell module in FIG. 1.

With reference to FIG. 8, the fuel cell stack 14 will be described. FIG. 8 is a perspective view showing the fuel cell stack 14 in this embodiment. As shown in FIG. 8, one fuel cell stack 14 includes, for example, sixteen fuel cell units 16. The upper and lower end of the plurality of fuel cell units 16 are integrally supported by a fuel gas tank upper plate 68a and an upper support plate 100, respectively, both of which are made of ceramic. The fuel gas tank upper plate 68a and the upper support plate 100 have through holes through which the inner electrode terminals 86 of each fuel cell unit 16 can extend.

The fuel cell unit 16 has a collector 102 and an outer terminal 104. The collector 102 electrically connects the inner electrode terminal 86 mounted to an inner electrode layer 90 that is a fuel electrode, and an outer peripheral surface of the outer electrode layer 92 that is an air electrode of an adjacent fuel cell unit 16. The outer terminal 104 is connected to the inner electrode terminals 86 at the upper and lower ends of two fuel cell units 16, 16 located at the end of each fuel cell stack 14, and further connected to the inner electrode terminals 86 at the upper and lower ends of the fuel cell unit 16 located at the end of an adjacent fuel cell stack 14, so that all the fuel cell units 16 (for example, 160 fuel cell units described above) are connected in series. As such, the plurality of fuel cell stacks 14 each including the plurality of fuel cell units 16 are coupled and electrically connected to constitute the fuel cell assembly 12 having a substantially rectangular parallelepiped shape as described above.

With reference to FIGS. 9 to 13, a configuration and action of a structure (seal structure) for separating the fuel gas and the oxidant gas described above will be described in more detail.

Figure 9:
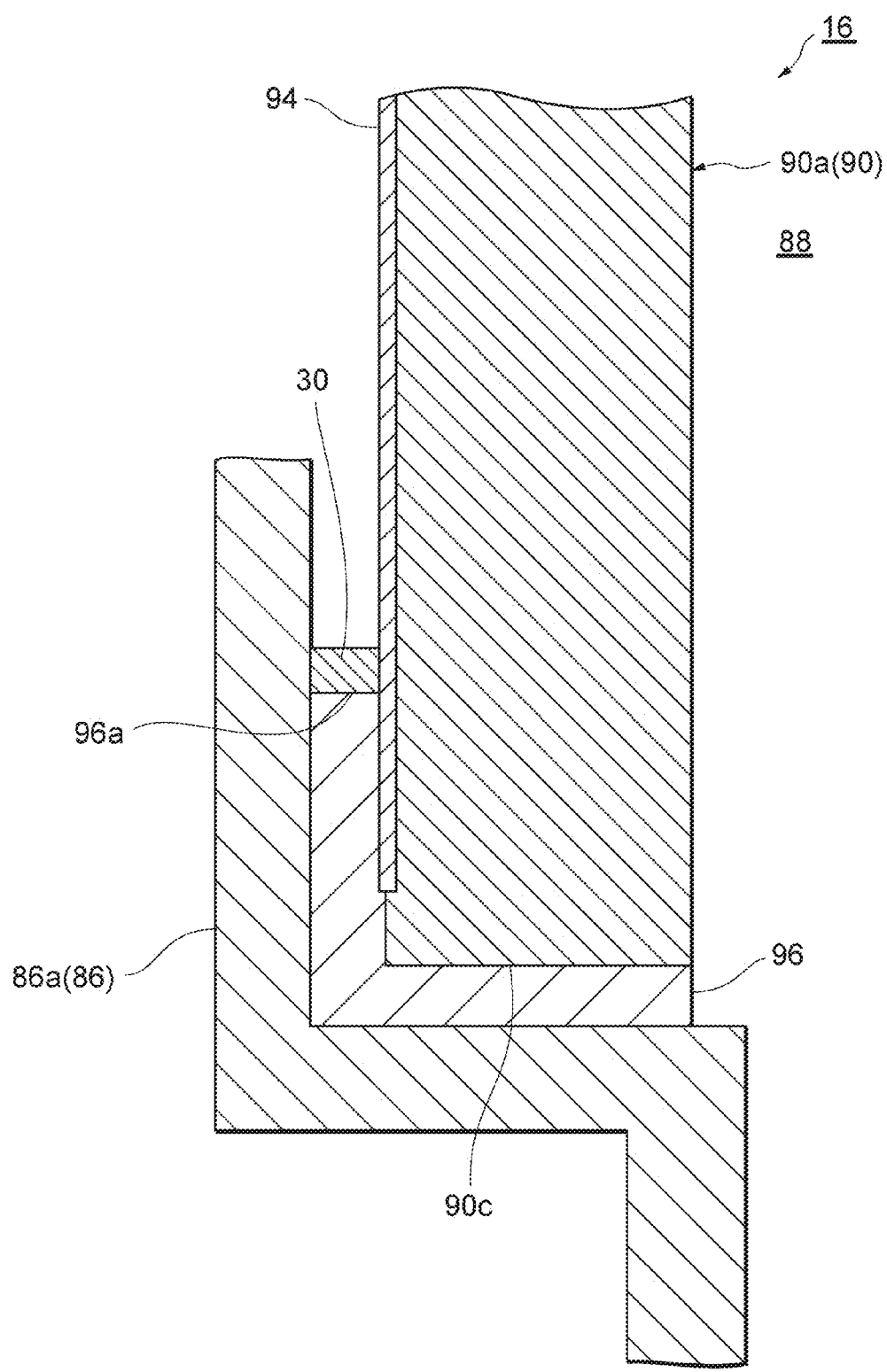
FIG. 9 is a partial sectional view showing the fuel cell unit in FIG. 7 in a partially enlarged manner.

FIG. 9 is a partial sectional view showing the fuel cell unit 16 in FIG. 7 in a partially enlarged manner, and schematically shows a state around the exposed portion 90a of the inner electrode layer 90 and the collector cap 86a (conductive cap) included in the inner electrode terminal 86. As described above, the inner electrode terminal 86 (the collector cap 86a thereof) is connected to the inner electrode layer 90 via the seal material 96 as an Ag seal portion. The collector cap 86a has a cup shape, is placed to face an outer wall surface of the exposed portion 90a of the inner electrode layer 90, and the seal material 96 is filled between the collector cap 86a and the inner electrode layer 90. As such, the inner electrode terminal 86 including the collector cap 86a is provided between the plurality of fuel cell units 16, and constitutes a part of a partition that separates the fuel gas from the oxidant gas.

The shown upper end surface 96a of the seal material 96 is covered with a glass coating 30 (dense body) provided to fill between the inner electrode layer 90 and the electrolyte layer 94 and the collector cap 86a. As such, the fuel cell unit 16 includes the seal material 96 as an Ag seal portion that separates the fuel gas from the oxidant gas, and the glass coating 30 as a dense body that is formed to at least partially cover at least either an area located on the fuel gas side or an area located on the oxidant gas side in the seal material 96.

In the SOFC device 1 including the fuel cell module 2 thus configured, the fuel gas is separated from the oxidant gas by the seal material 96 mainly composed of Ag in the fuel cell unit 16 and the fuel cell has high compactness (gas impermeability) of the Ag seal portion. Therefore, degradation of the Ag seal portion due to oxidation or the like is substantially suppressed during operation of the SOFC device 1 and during the formation of the Ag seal portion by sintering. The electrolyte layer 94 extends to enter the seal material 96 beyond the upper end surface 96a of the seal material 96.

Further, the glass coating 30 constituting a dense body covers the upper end surface 96a of the seal material 96 (at least a part of at least either the area located on the fuel gas side or the area located on the oxidant gas side). Thus, the glass coating 30 functions as a barrier material, and prevents at least oxygen atoms (O) and water vapor ($H_2O$) generated from the oxidant gas from entering the seal material 96. This can prevent degradation of Ag such as pores or cracks in the Ag seal portion which is attributed to water vapor. The Ag seal portion without degradation can prevent contact between the fuel gas and the oxidant gas, which causes reaction between the two gases to produce water, and resulting wasteful consumption of the gases which causes deterioration of power generation efficiency and reduced output of the SOFC device 1 (the porosity with expansion of the seal material 96 leading to deterioration of output).

FIGS. 12(A) to 12(C) are partial sectional views schematically showing states of occurrence of the porosity with Ag expansion in a conventional configuration without the glass coating 30 on the seal material 96. When no glass coating 30 is formed on the upper end surface 96a of the seal material 96, hydrogen gas or hydrogen atoms generated from the fuel gas F1, and oxygen gas or oxygen atoms generated from the oxidant gas F2 may enter the seal material 96 from the end thereof (FIG. 12(A)). Then, water (water vapor) is produced in the seal material 96, and volume expansion of the seal material 96 causes pores and thus the porosity with expansion of the seal material 96. Then, the seal material 96 applies stress (arrow Y1 in the drawing) to press the collector cap 86a and the exposed portion 90a of the inner electrode layer 90 (FIG. 12(B)).

Figure 13:
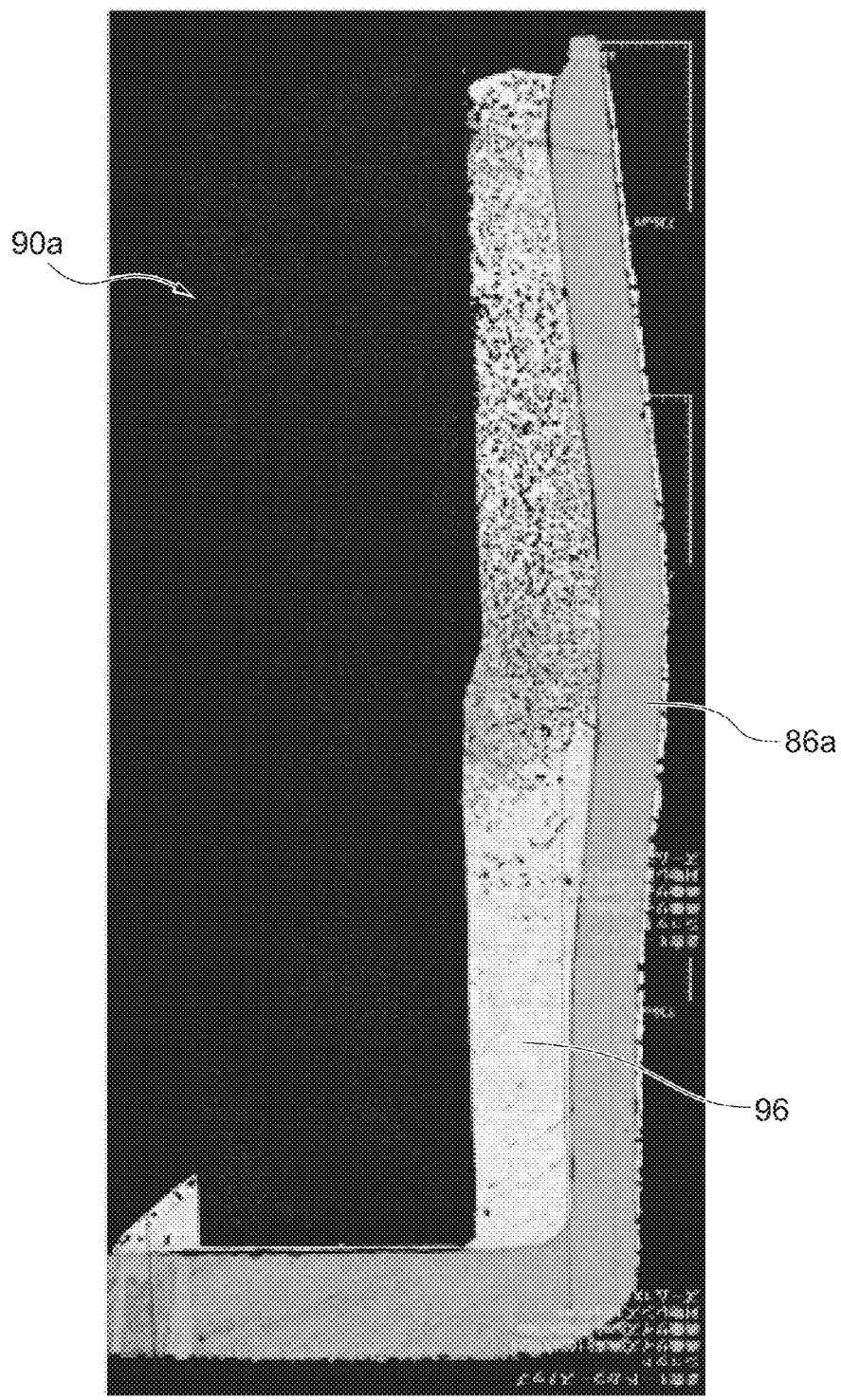
FIG. 13 is a sectional micrograph showing an example of a state of the seal material with the porosity with Ag expansion and its surroundings in the conventional configuration schematically shown in FIG. 12(B).

FIG. 13 is a sectional micrograph showing an example of a state of the porosity with expansion of the seal material and its surroundings. In such a state, the fuel gas F1 and the oxidant gas F2 begin to leak and thereby mix with each other. If the SOFC device is further operated and power generation by the fuel cell unit is repeated, stress (arrow Y2 in the drawing) is applied such that the shown upper ends of the collector cap 86a and the seal material 96 are away from the inner electrode layer 90, and a part of the seal material 96 is deformed so as to be peeled off from the inner electrode layer 90, thereby causing more remarkable leaks of the fuel gas F1 and the oxidant gas F2 (FIG. 12(C)).

In the SOFC device 1 of this embodiment, as shown in FIG. 9, the glass coating 30 is formed on the upper end surface 96a of the seal material 96, and thus initial leak as shown in FIG. 12(A) does not occur.

The glass material for forming the glass coating 30 can be generally softened or melted at a temperature under a melting point of Ag comprising a main constituent material for the seal material 96, and thus can more reliably cover the seal material 96 than other materials other than glass, thereby increasing sealing performance of the seal material 96 and sealing performance by the seal material 96. Further, using the glass coating 30 as a dense body has good morphological stability at an operation temperature of the fuel cell unit 16 and prevents deformation and degradation. This can further increase the sealing performance of the seal material 96 and the sealing performance by the seal material 96. As a result, the seal material 96 more reliably prevented contact between the fuel gas and the oxidant gas via the seal material 96 can be more reliably prevented, thereby further effectively preventing deterioration of output of the SOFC device 1 attributed to the porosity with expansion of the seal material 96.

Figure 10:
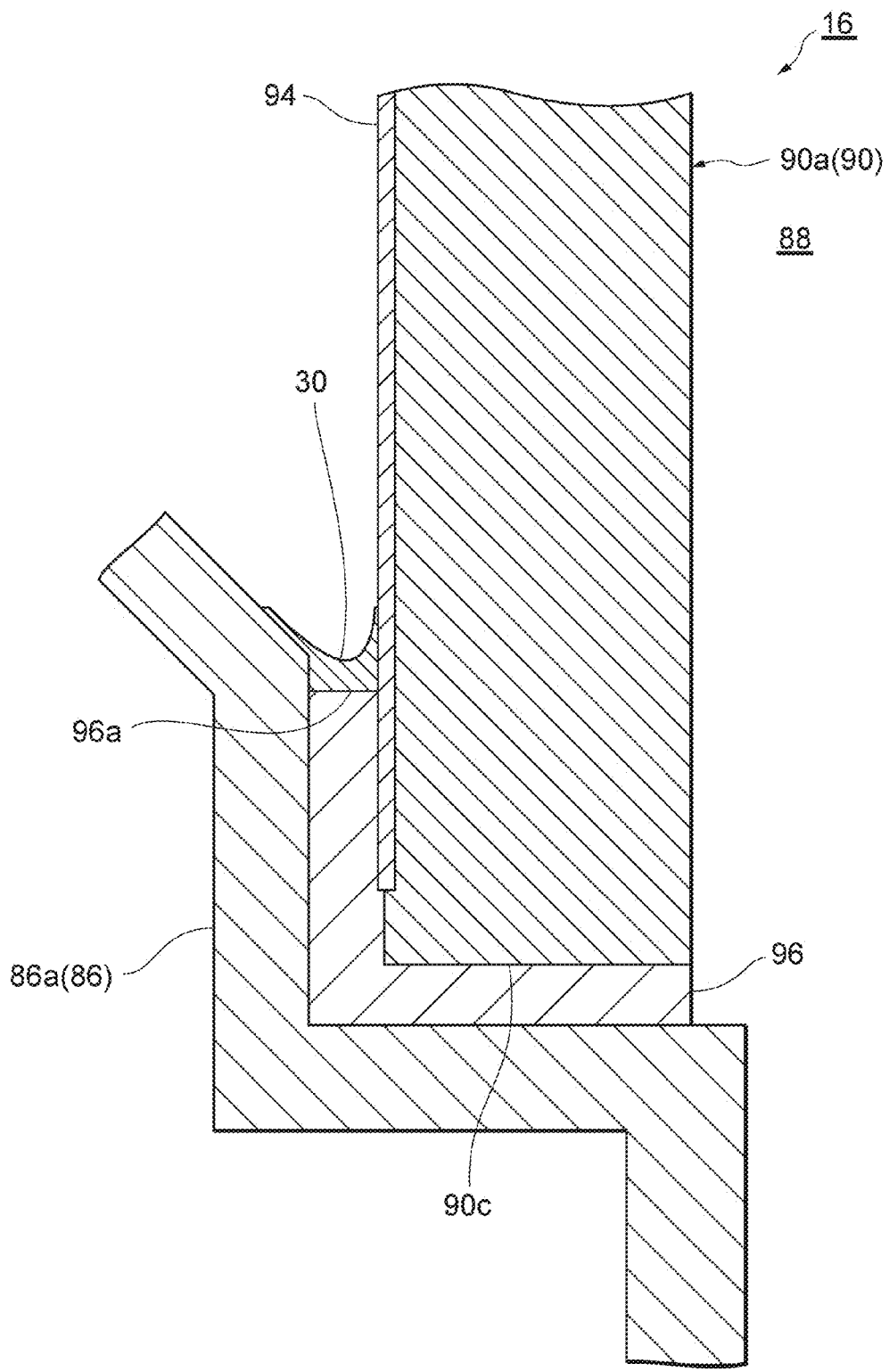
FIG. 10 is a partial sectional view showing another aspect of the fuel cell unit in FIG. 7 in a partially enlarged manner.

FIG. 10 is a partial sectional view showing another aspect of the fuel cell unit 16 in FIG. 7 in a partially enlarged manner, and like FIG. 9, schematically shows a state around the exposed portion 90a of the inner electrode layer 90 and the collector cap 86a included in the inner electrode terminal 86. This fuel cell unit 16 is configured similarly to the fuel cell unit 16 in FIG. 9 except that the shown upper end of the collector cap 86a is slightly away from the inner electrode layer 90, and the glass coating 30 is formed over the inner electrode layer 90, the electrolyte layer 94, and the seal material 96 of the fuel cell unit 16, and the collector cap 86a that constitutes a part of the partition described above.

The SOFC device 1 including the fuel cell unit thus configured, can also obtain an excellent gas barrier effect provided by the glass coating 30 as described above, that is, an effect of preventing deterioration of output attributed to the porosity with expansion of the seal material 96 (details will be omitted to avoid overlapping descriptions). Also, the glass coating 30 covers a wide range of area including a boundary between the inner electrode layer 90 and the seal material 96, a boundary between the electrolyte layer 94 and the seal material 96, and a boundary between the seal material 96 and the collector cap 86a, thereby increasing sealing performance at the area. This further increases sealing performance by the seal material 96 and further enhances a barrier function of the seal material 96. Thus, contact between the fuel gas and the oxidant gas via the seal material 96 can be further prevented, thereby further preventing deterioration of output of the SOFC device 1 due to the porosity with expansion of the seal material 96.

Further, the glass coating 30 is formed over the inner wall of the concave portion surrounded and defined by the inner electrode layer 90, the electrolyte layer 94, the seal material 96, and the collector cap 86*a*. Thus, the concave portion as a retention portion of the glass coating 30 easily holds the filled glass coating 30. Thus, the glass coating 30 can be more reliably formed over the inner electrode layer 90, the seal material 96, and the collector cap 86*a*, thereby more effectively preventing deterioration of output of the SOFC device 1 due to the porosity with expansion of the seal material 96.

Further, the glass coating 30 and the inner electrode layer 90, the electrolyte layer 94, and the collector cap 86*a* having electrical conductivity have significantly different thermal expansion coefficients. As shown in FIG. 10, the glass coating 30 is formed such that the thickness of the glass coating 30 on the upper end surface 96*a* of the seal material 96 is larger than the thickness of the glass coating 30 on the inner electrode layer 90 and on the collector cap 86*a*, thereby preventing cracks in the glass coating 30 that may occur due to expansion/contraction during operation/stop of each fuel cell unit 16 in the SOFC device 1.

Specifically, the glass coating 30 is formed such that the glass coating 30 has a relatively larger thickness on the seal material 96, and has relatively smaller thickness on the inner electrode layer 90, the electrolyte layer 94, and the collector cap 86*a*. Thus, the sealing performance of the seal material 96 and the sealing performance by the seal material 96 can be favorably maintained. As a result, the seal material 96 can prevent contact between the fuel gas and the oxidant gas, thereby further preventing deterioration of output of the SOFC device 1 due to the porosity with expansion of the seal material 96.

For example, the glass coating 30 can be obtained by pouring slurry containing glass powder, an organic binder, a solvent, and the like into the concave portion, and to dry and burn the slurry. Heating at a softening temperature of glass or more during the burning can provide a denser glass coating. Further, in use of crystallized glass, heating at a crystallization temperature or more can provide a crystallized glass coating.

Figure 11:
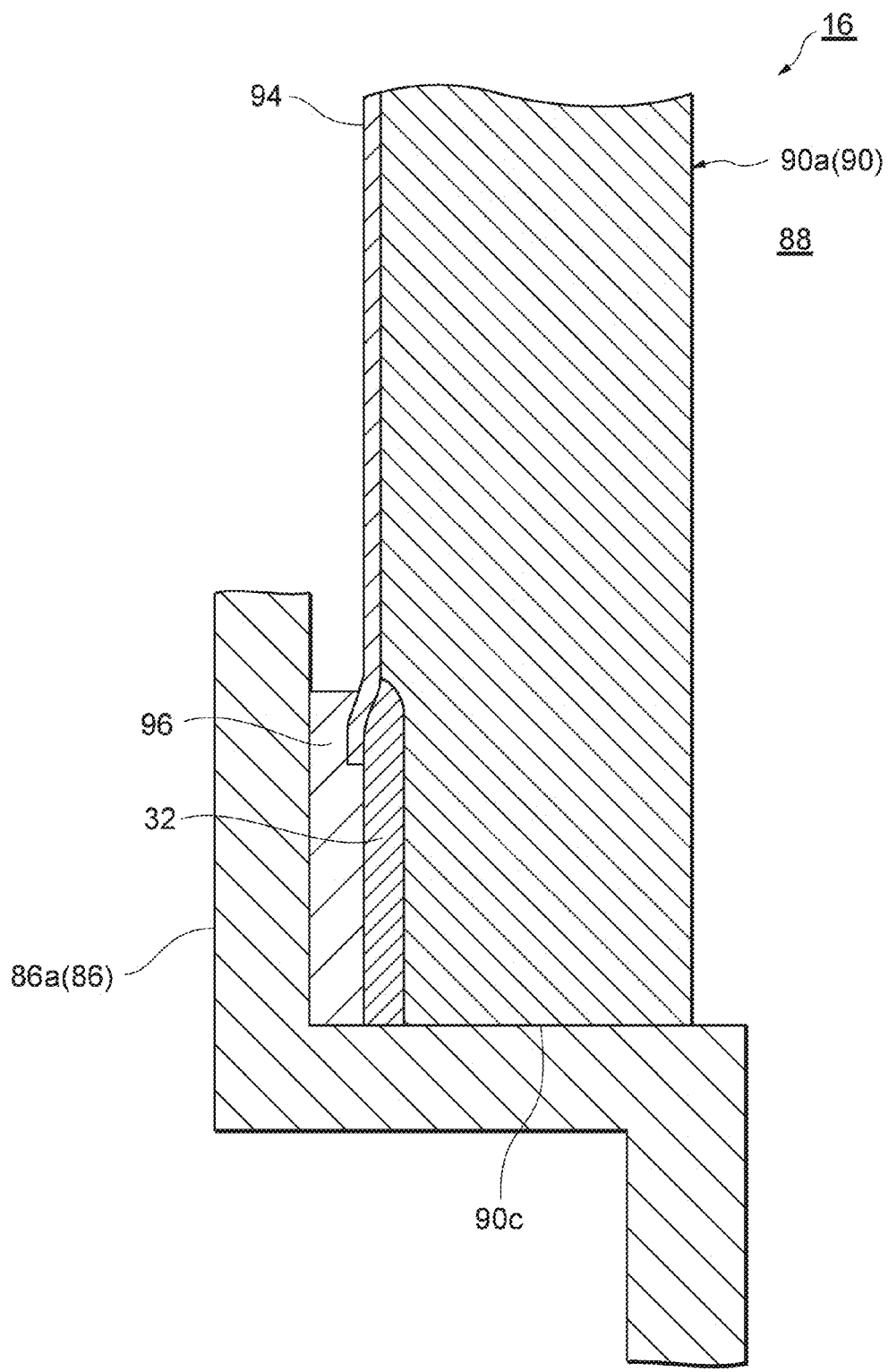
FIG. 11 is a partial sectional view showing a further aspect of the fuel cell unit in FIG. 7 in a partially enlarged manner.

FIG. 11 is a partial sectional view showing a further aspect of the fuel cell unit 16 in FIG. 7 in a partially enlarged manner, and like FIG. 9, schematically shows the exposed portion 90*a* of the inner electrode layer 90 and the collector cap 86*a* included in the inner electrode terminal 86. This fuel cell unit 16 is configured similarly to the fuel cell unit 16 in FIG. 9 except that the glass coating 30 is replaced by a lanthanum chromite coating 32 that has electrical conductivity and is coated between the side surface of the exposed portion 90*a* of the inner electrode layer 90 and the seal material 96.

Lanthanum chromite ($LaCrO_3$) that is a perovskite-type complex oxide doped with an addition component such as Sr or Ca and having electrical conductivity is a material that is extremely stable under oxidizing atmosphere and reducing atmosphere even at a high temperature, and hardly reacts with hydrogen and oxygen, and thus has high stability as a dense body. This allows a barrier function of the lanthanum chromite coating 32 to be favorably maintained over a longer period.

As described above, the present invention is not limited to specific examples described in the embodiments, but many variations may be made without changing the gist of the invention. Specifically, the specific examples with appropriate design variation made by those skilled in the art are included in the technical scope of the present invention as long as they have the feature of the present invention. In other words, each component in the specific examples described above and the placement, material, condition, shape, size and the like thereof are not limited to those illustrated, but may be appropriately changed. The components in the embodiments described above may be combined if technically accepted, and the combination thereof are also included in the technical scope of the present invention as long as it includes the feature of the present invention.

Figure 14:
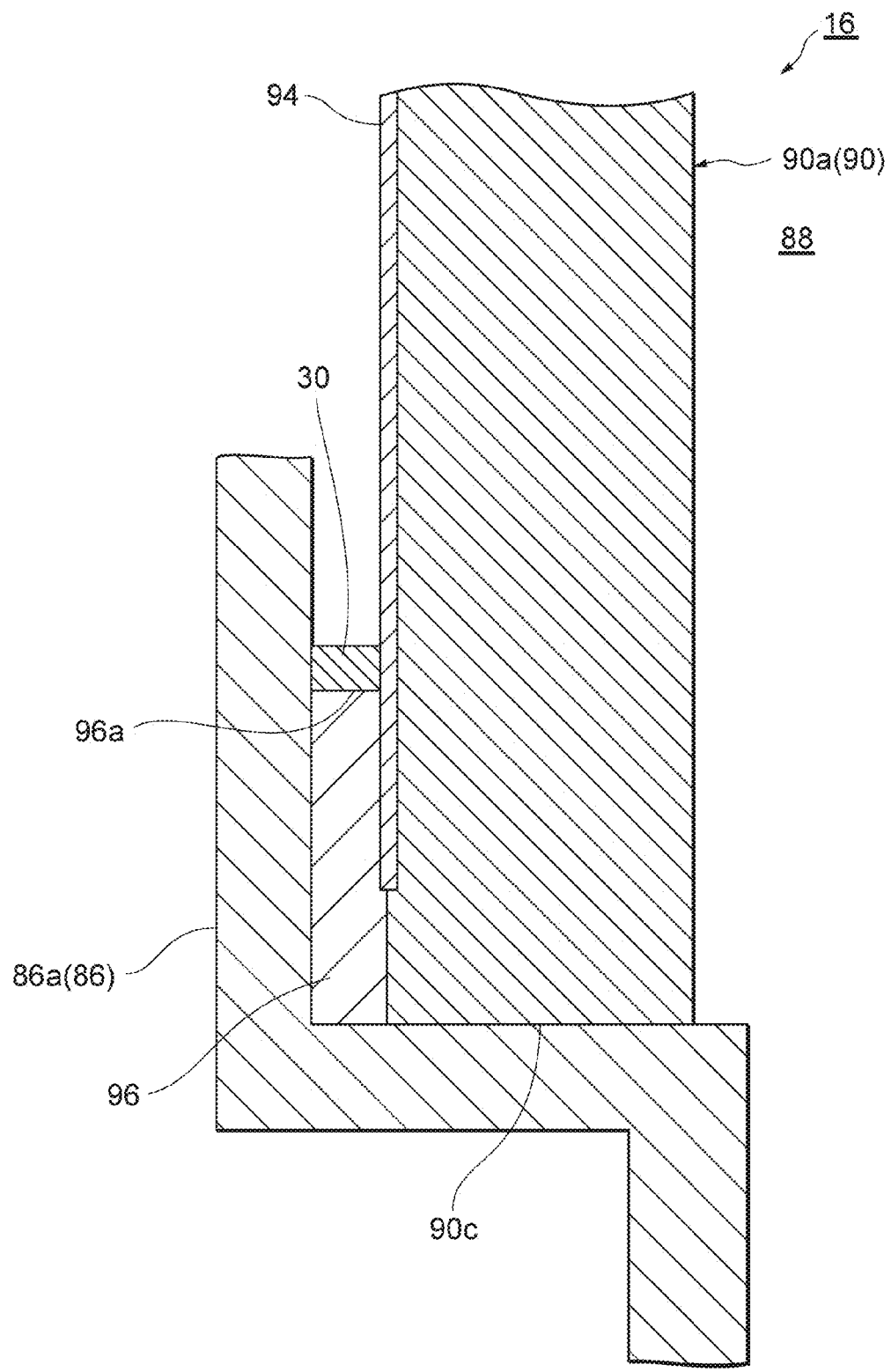
FIG. 14 shows a variant of the fuel cell unit in FIG. 9.
Figure 15:
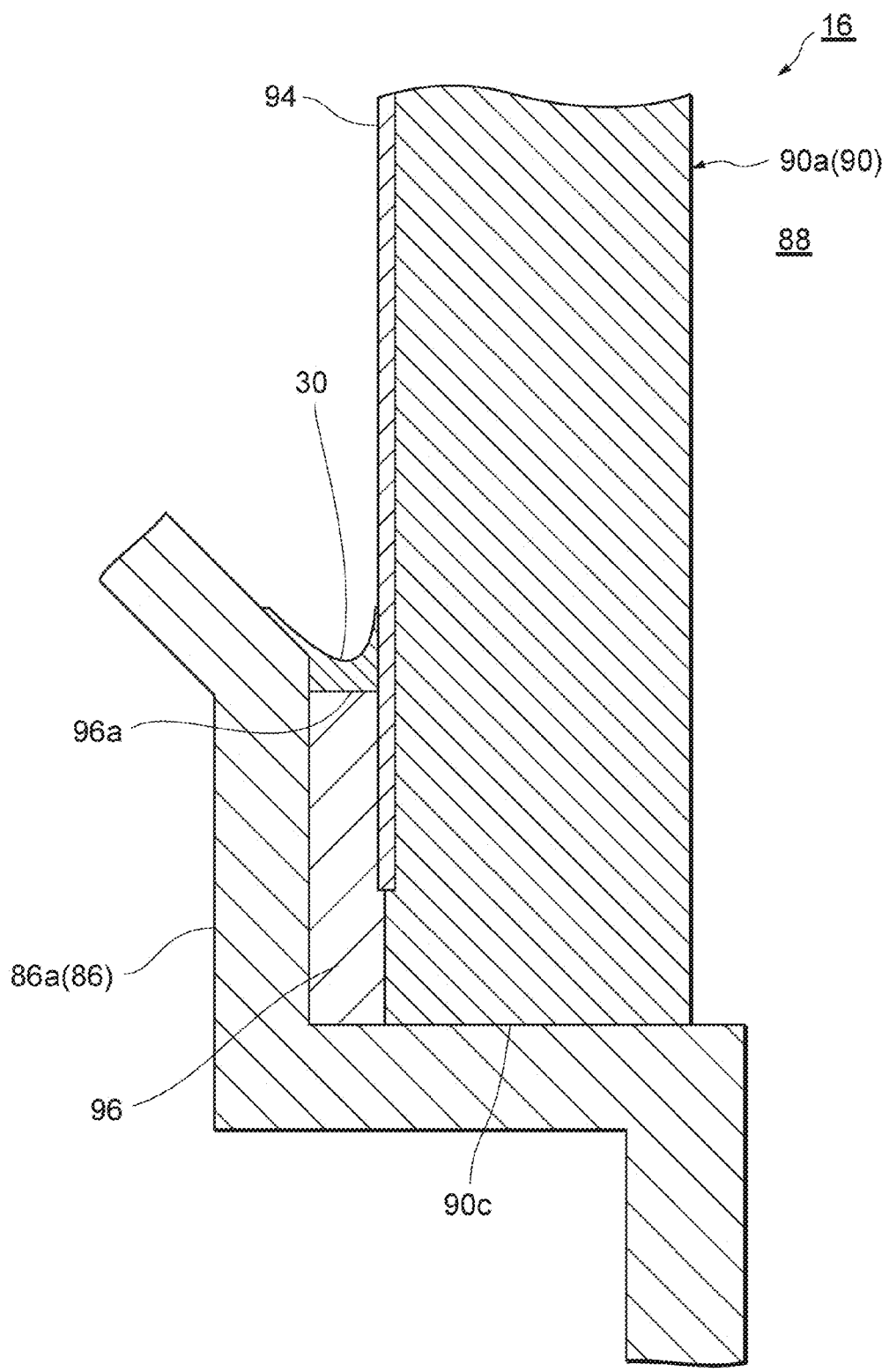
FIG. 15 shows a variant of the fuel cell unit in FIG. 10.

Specifically, for example, the upper end surface 90*c* of the inner electrode layer 90 shown in FIGS. 9 to 11 is connected to the inner electrode terminal 86 via the seal material 96, but as shown in FIG. 7, the upper end surface 90*c* of the inner electrode layer 90 may be directly connected to the inner electrode terminal 86. FIG. 14 shows a variant in which the upper end surface 90*c* of the inner electrode layer 90 shown in FIG. 9 is extended to the inner electrode terminal 86, and FIG. 15 shows a variant in which the upper end surface 90*c* of the inner electrode layer 90 shown in the FIG. 10 is extended to the inner electrode terminal 86. The end of the electrolyte layer 94 shown in FIGS. 9 to 11 extends to enter the seal material 96 beyond the upper end surface 96*a* of the seal material 96, but may be aligned with the upper end surface 96*a*.

Further, in the embodiments described above, the aspect has been described in which the dense body such as the glass coating 30 or the lanthanum chromite coating 32 is provided on the seal material 96 that separates the fuel gas and the oxidant gas in the fuel cell including the inner side fuel electrode and the outer side air electrode. Similarly, the same kind of dense body may be provided on a seal material 96 that is provided in a fuel cell including an outer side fuel electrode and an inner side air electrode. In the embodiments described above, the aspect for the cylindrical cell has been described, but the present invention may be similarly applied to a case where fuel gas is separated from oxidant gas in a planar type cell. In such a case, the partition in the cylindrical cell corresponds to a separator in the planar type cell, and other components such as a fuel electrode, an air electrode, and an electrolyte layer may be considered in a similar manner to those in the cylindrical cell. With reference to FIGS. 16, 17, 18, 19, and 20, a specific example of application to the planar type cell will be described.

Figure 16:
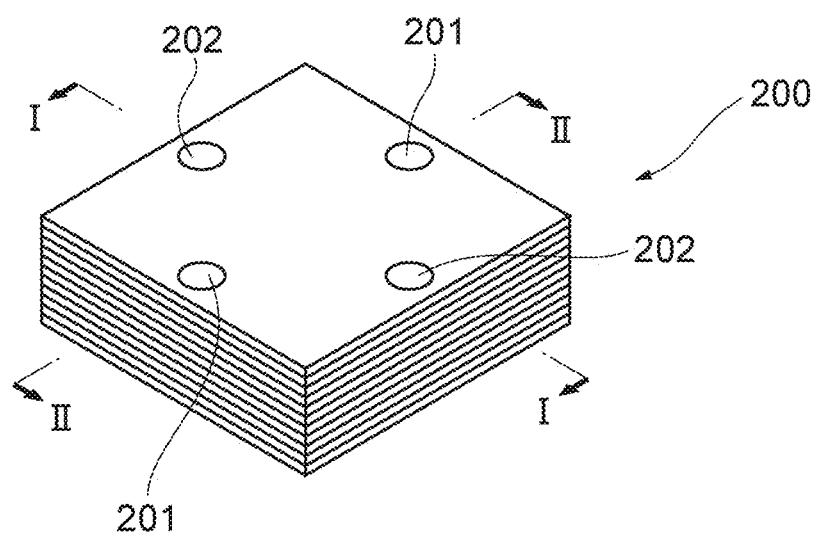
FIG. 16 is a perspective view of an appearance showing a variant in which a dense body in this embodiment is applied to a flat plate fuel cell stack.
Figure 17:
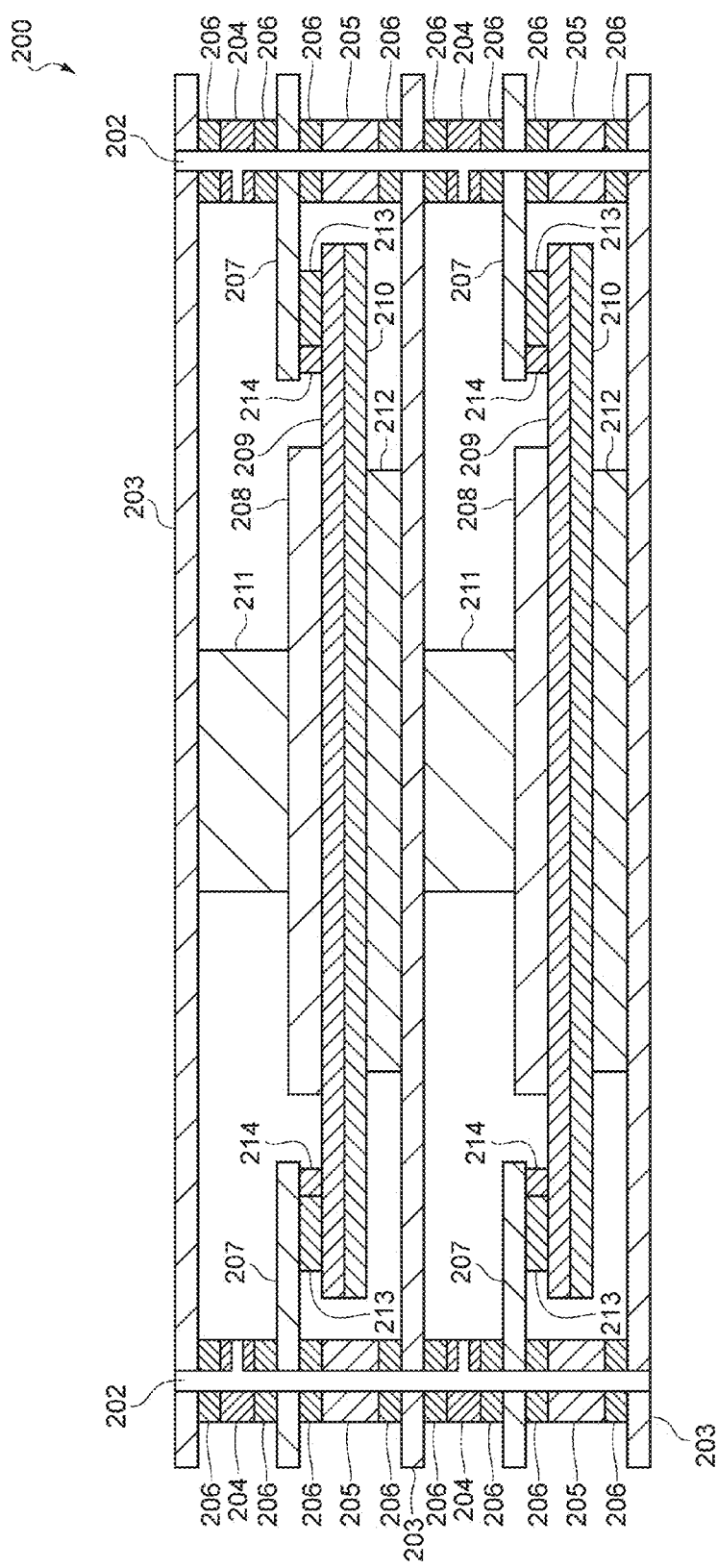
FIG. 17 is a schematic sectional view schematically showing a I-I section in FIG. 16.
Figure 18:
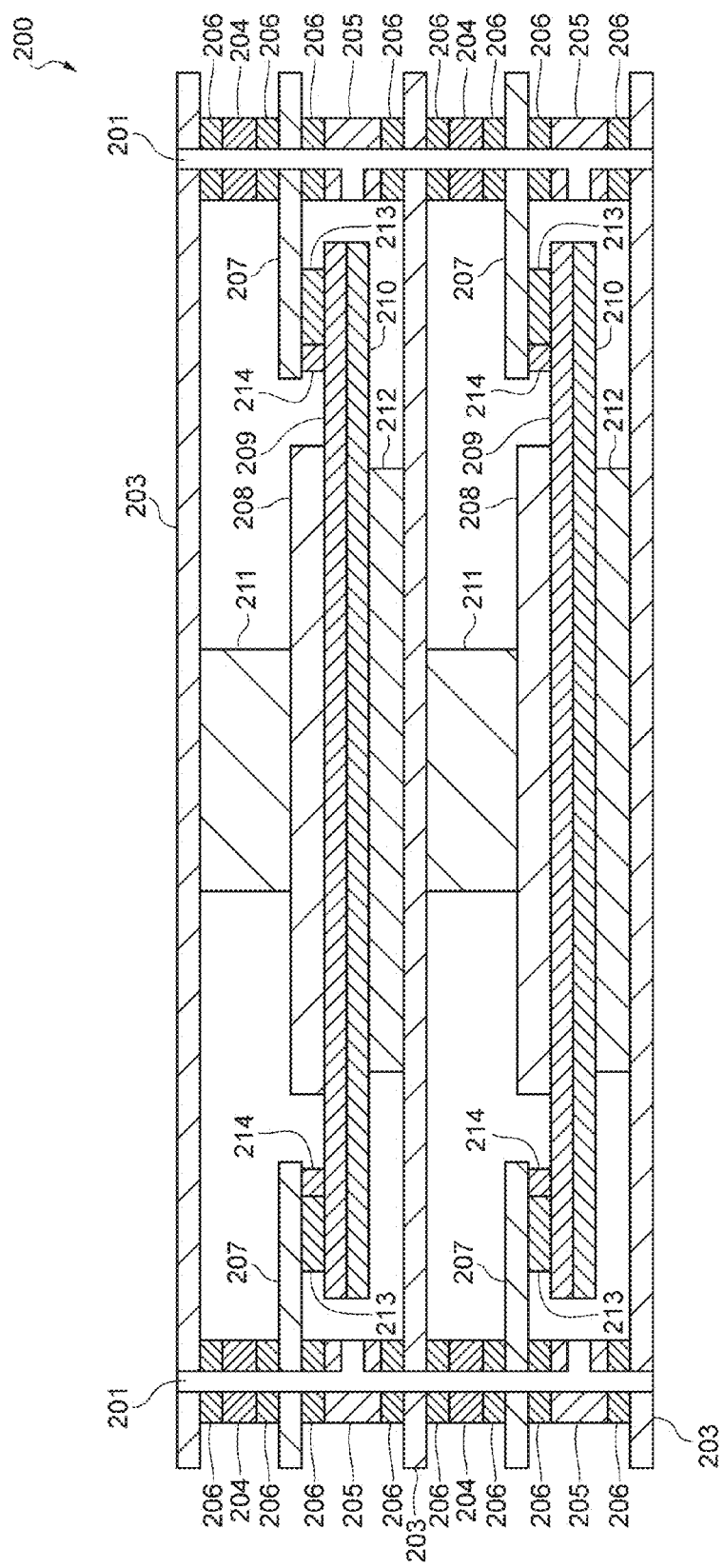
FIG. 18 is a schematic sectional view schematically showing a II-II section in FIG. 16.
Figure 19:
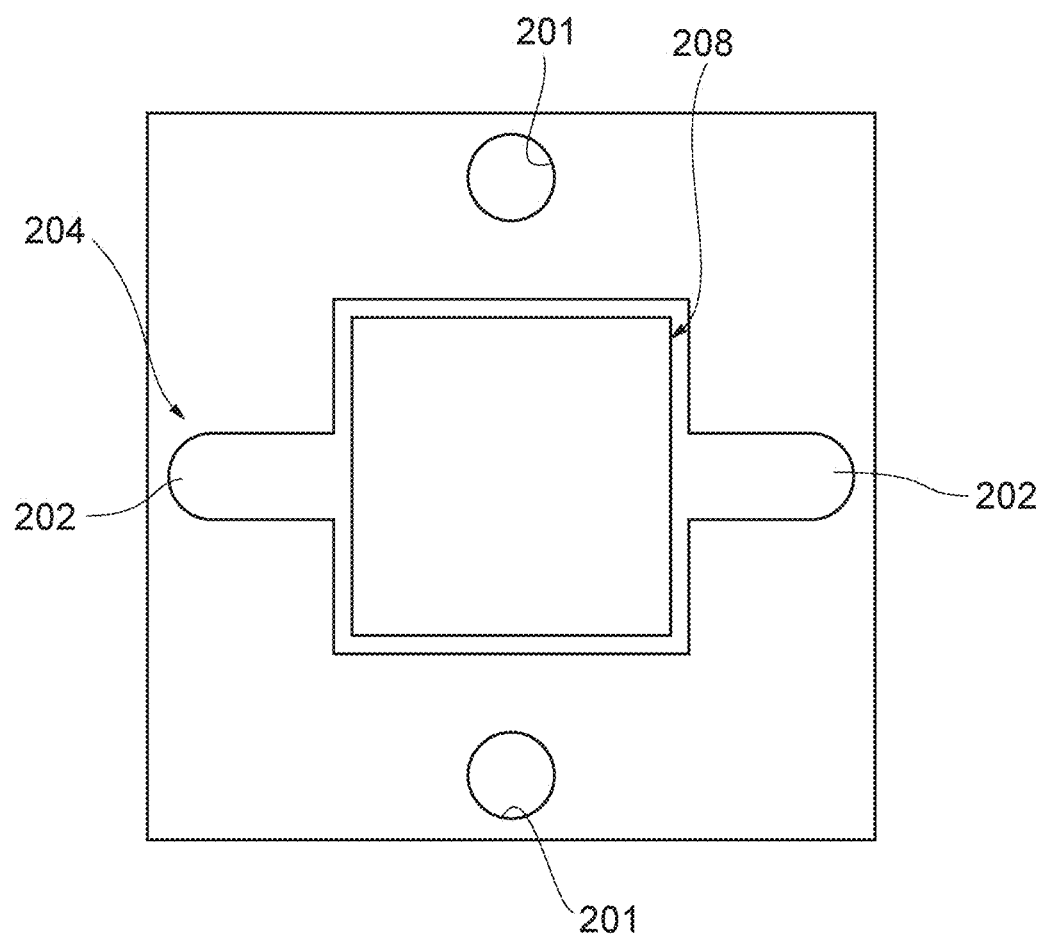
FIG. 19 is a schematic sectional view showing an area near the center of an air frame in FIG. 17 cut in a plane along the frame.
Figure 20:
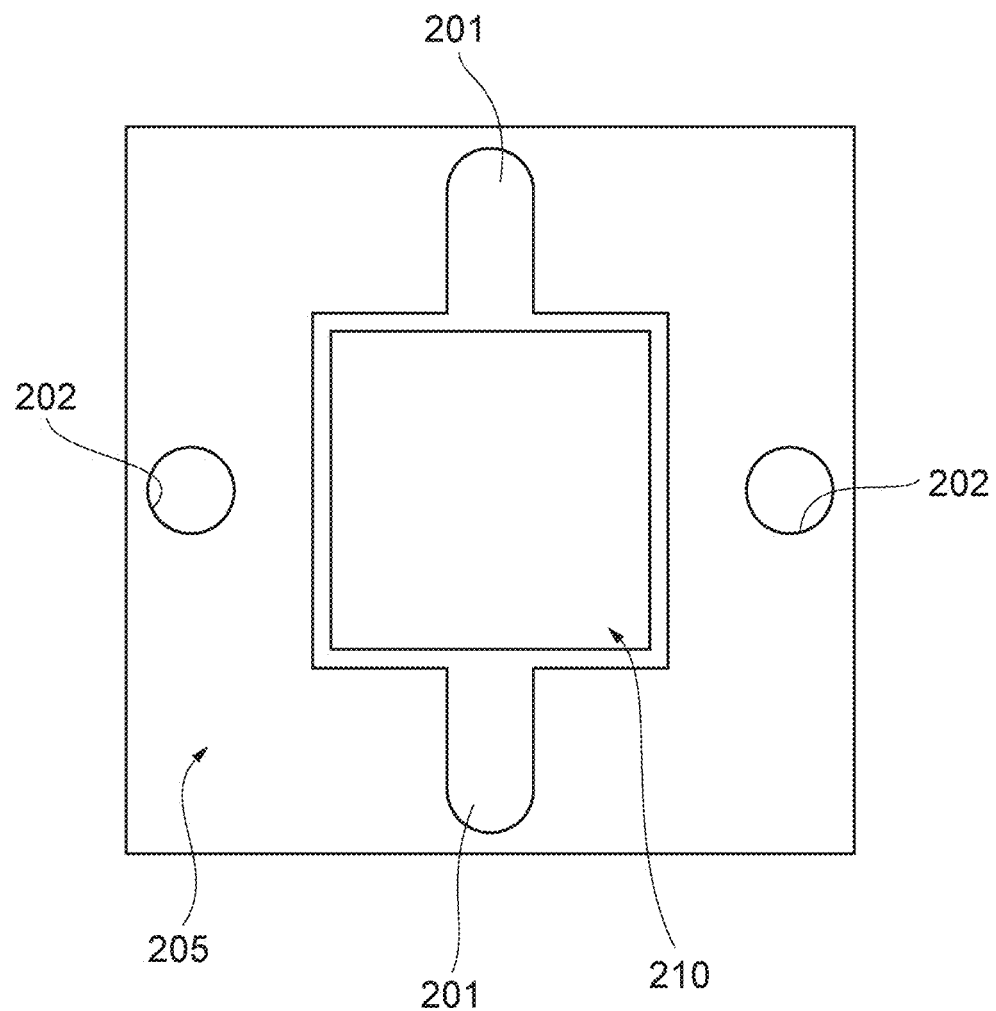
FIG. 20 is a schematic sectional view showing an area near the center of a fuel frame in FIG. 17 cut in a plane along the frame.

FIG. 16 is a perspective view of an appearance showing a variant in which the dense body in this embodiment is applied to a planar type fuel cell stack. FIG. 17 is a schematic sectional view showing a I-I section in FIG. 16. FIG. 18 is a schematic sectional view showing a II-II section in FIG. 16. FIG. 19 is a schematic sectional view showing an area near the center of an air frame in FIG. 17 cut in a plane along the frame. FIG. 20 is a schematic sectional view showing an area near the center of a fuel frame in FIG. 17 cut in a plane along the frame.

FIG. 16 shows a fuel cell stack 200 is a planar type cell stack. The fuel cell stack 200 includes a fuel gas channel 201 and an oxidant gas channel 202.

As shown in FIGS. 17 and 18, the fuel cell stack 200 includes a multilayer structure. In the drawings, a separator 203, an anode collector member 212, an anode 210, an electrolyte layer 209, a cathode 208 and an intermediate plate 207 are stacked. A rectangular opening is provided at the center of the intermediate plate 207 so that the cathode 208 is exposed. The cathode 208 is connected to an upper side separator 203 where a cathode collector member 211 is disposed therebetween.

The fuel frame 205 is placed along an outer periphery of the separator 203. The fuel frame 205 is joined to the separator 203 by using a brazed material 206. The fuel frame 205 is further joined to the intermediate plate 207 by using the brazed material 206. An Ag seal material 213 and a glass coating 214 as a dense body are placed between the intermediate plate 207 and the electrolyte layer 209.

The glass coating 214 is provided on the cathode 208 side of the Ag seal material 213, thereby preventing the Ag seal material 213 from contacting oxygen during operation to suppress deterioration of electrical conductivity, which deterioration is caused by an Ag oxide layer to be generated by the contact.

An air frame 204 is placed along an outer periphery of the intermediate plate 207. The air frame 204 is joined to the intermediate plate 207 by using the brazed material 206. The air frame 204 is further joined to an upper side separator 203 by a brazed material.

FIG. 19 shows a section of a plane along the air frame 204 near the center of the air frame 204 and air passes through the oxidant gas channel 202 flows toward the cathode 208.

FIG. 20 shows a section of a plane along the fuel frame 204 near the center of the fuel frame 205 and t fuel gas passes through the fuel gas channel 201 flows toward the anode 210.

INDUSTRIAL APPLICABILITY

As described above, according to the SOFC device of the present invention, the dense body is provided in a predetermined area of the Ag seal portion on the fuel cell in order to separate the oxidizing side and the reducing side, thereby preventing leaks and contact of the fuel gas and the oxidant gas as well as the porosity with expansion of the Ag seal portion, and allowing output of the fuel cell with high power generation efficiency to be maintained. Thus, the present invention can be widely and effectively used in production and use of SOFC devices available for various purposes, and equipment, systems, and facilities including the SOFC devices.

REFERENCE SIGNS LIST 1 solid oxide fuel cell (SOFC) device
2 fuel cell module
10 power generation chamber
12 fuel cell assembly
14 fuel cell stack
16 fuel cell unit
18 combustion chamber
20 reformer
21 rectifier
21a opening
22 heat exchanger
30 glass coating (dense body)
32 lanthanum chromite coating (dense body)
56 casing
60 unreformed gas supply pipe
62 water supply pipe
66 fuel supply pipe
66a lower end side
68 fuel gas tank
68a fuel gas tank upper plate
70 combustion gas pipe
72 power generation air channel
72a outlet port
74 power generation air inlet pipe
76 communication channel
76a outlet port
77a, 77b power generation air supply passage
82 combustion gas exhaust pipe
84 fuel cell
86 inner electrode terminal (partition)
86a collector cap (conductive cap, partition)
88 fuel gas channel
90 inner electrode layer (anode)
90a exposed portion
90b outer peripheral surface
90c upper end surface
92 outer electrode layer (cathode)
94 electrolyte layer
96 seal material
96a upper end surface
98 fuel gas channel
100 upper support plate
102 collector
104 outer terminal
F1 fuel gas
F2 oxidant gas

The invention claimed is:

1. A solid oxide fuel cell device that generates power by using fuel gas and oxidant gas, comprising
a fuel cell assembly having a plurality of fuel cells each including a fuel electrode layer to which the fuel gas is supplied, an air electrode layer to which the oxidant gas is supplied, and a solid electrolyte layer provided between the fuel electrode layer and the air electrode layer; and
a partition provided between the plurality of fuel cells,
wherein the fuel cell includes an Ag seal portion that separates the fuel gas and the oxidant gas, and a dense body is at least partially formed over at least either a fuel gas side surface of the Ag seal portion or an oxidant gas side surface of the Ag seal portion,
the Ag seal portion is filled between the fuel cell and the partition,
the dense body is formed over the fuel cell, the Ag seal portion, and the partition,
the solid oxide fuel cell device further has a concave portion surrounded and defined by the fuel cell, the Ag seal portion and the partition,
the dense body is formed over an inner wall of the concave portion, and
the thickness of the dense body on the Ag seal portion in the concave portion is larger than the thickness of the dense body on the fuel cell in the concave portion and the thickness of the dense body on the partition in the concave portion.

2. The solid oxide fuel cell device according to claim 1, wherein the dense body comprises glass.

3. The solid oxide fuel cell device according to claim 1, wherein the partition includes a conductive cap that partially covers the fuel cell.

4. The solid oxide fuel cell device according to claim 3, wherein the concave portion is surrounded and defined by the fuel cell, the Ag seal portion, and the conductive cap.

5. The solid oxide fuel cell device according to claim 1, wherein the dense body comprises an oxide that contains lanthanum and chrome.

* * * * *